United States Patent
Tiwari

(10) Patent No.: US 11,526,355 B2
(45) Date of Patent: *Dec. 13, 2022

(54) SMALLEST OR LARGEST VALUE ELEMENT DETERMINATION

(71) Applicant: Micron Technology, Inc., Boise, ID (US)

(72) Inventor: Sanjay Tiwari, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 4 days.

This patent is subject to a terminal disclaimer.

(21) Appl. No.: 17/339,691

(22) Filed: Jun. 4, 2021

(65) Prior Publication Data

US 2021/0294606 A1 Sep. 23, 2021

Related U.S. Application Data

(63) Continuation of application No. 15/237,085, filed on Aug. 15, 2016, now Pat. No. 11,029,951.

(51) Int. Cl.
*G06F 9/30* (2018.01)
*G06F 15/78* (2006.01)

(52) U.S. Cl.
CPC ........ *G06F 9/30036* (2013.01); *G06F 9/3001* (2013.01); *G06F 9/3004* (2013.01); *G06F 9/30021* (2013.01); *G06F 15/785* (2013.01)

(58) Field of Classification Search
None
See application file for complete search history.

(56) References Cited

U.S. PATENT DOCUMENTS

| 4,380,046 A | 4/1983 | Fung |
| 4,435,792 A | 3/1984 | Bechtolsheim |

(Continued)

FOREIGN PATENT DOCUMENTS

| CN | 102141905 | 8/2011 |
| EP | 0214718 | 3/1987 |

(Continued)

OTHER PUBLICATIONS

"4.9.3 MINLOC and MAXLOC", Jun. 12, 1995, (5pgs.), Message Passing Interface Forum 1.1, retrieved from http://www.mpi-forum.org/docs/mpi-1.1/mpi-11-html/node79.html.

(Continued)

*Primary Examiner* — Eric Coleman
(74) *Attorney, Agent, or Firm* — Brooks, Cameron & Huebsch, PLLC

(57) ABSTRACT

Examples of the present disclosure provide apparatuses and methods for smallest value element or largest value element determination in memory. An example method comprises: storing an elements vector comprising a plurality of elements in a group of memory cells coupled to an access line of an array; performing, using sensing circuitry coupled to the array, a logical operation using a first vector and a second vector as inputs, with a result of the logical operation being stored in the array as a result vector; updating the result vector responsive to performing a plurality of subsequent logical operations using the sensing circuitry; and providing an indication of which of the plurality of elements have one of a smallest value and a largest value.

20 Claims, 9 Drawing Sheets

(56) References Cited

U.S. PATENT DOCUMENTS

| | | | |
|---|---|---|---|
| 4,435,793 A | 3/1984 | Ochii |
| 4,567,572 A | 1/1986 | Morris et al. |
| 4,727,474 A | 2/1988 | Batcher |
| 4,843,264 A | 6/1989 | Galbraith |
| 4,958,378 A | 9/1990 | Bell |
| 4,977,542 A | 12/1990 | Matsuda et al. |
| 5,023,838 A | 6/1991 | Herbert |
| 5,034,636 A | 7/1991 | Reis et al. |
| 5,201,039 A | 4/1993 | Sakamura |
| 5,210,850 A | 5/1993 | Kelly et al. |
| 5,253,308 A | 10/1993 | Johnson |
| 5,276,643 A | 1/1994 | Hoffman et al. |
| 5,325,519 A | 6/1994 | Long et al. |
| 5,367,488 A | 11/1994 | An |
| 5,379,257 A | 1/1995 | Matsumura et al. |
| 5,386,379 A | 1/1995 | Ali-Yahia et al. |
| 5,398,213 A | 3/1995 | Yeon et al. |
| 5,430,687 A | 7/1995 | Hung et al. |
| 5,440,482 A | 8/1995 | Davis |
| 5,446,690 A | 8/1995 | Tanaka et al. |
| 5,473,576 A | 12/1995 | Matsui |
| 5,481,500 A | 1/1996 | Reohr et al. |
| 5,485,373 A | 1/1996 | Davis et al. |
| 5,506,811 A | 4/1996 | McLaury |
| 5,615,404 A | 3/1997 | Knoll et al. |
| 5,638,128 A | 6/1997 | Hoogenboom |
| 5,638,317 A | 6/1997 | Tran |
| 5,654,936 A | 8/1997 | Cho |
| 5,678,021 A | 10/1997 | Pawate et al. |
| 5,724,291 A | 3/1998 | Matano |
| 5,724,366 A | 3/1998 | Furutani |
| 5,751,987 A | 5/1998 | Mahant-Shetti et al. |
| 5,787,458 A | 7/1998 | Miwa |
| 5,852,821 A | 12/1998 | Chen et al. |
| 5,854,636 A | 12/1998 | Watanabe et al. |
| 5,867,429 A | 2/1999 | Chen et al. |
| 5,870,504 A | 2/1999 | Nemoto et al. |
| 5,915,084 A | 6/1999 | Wendell |
| 5,935,263 A | 8/1999 | Keeth et al. |
| 5,953,738 A | 9/1999 | Rao |
| 5,986,942 A | 11/1999 | Sugibayashi |
| 5,991,209 A | 11/1999 | Chow |
| 5,991,785 A | 11/1999 | Midina et al. |
| 6,005,799 A | 12/1999 | Rao |
| 6,009,020 A | 12/1999 | Nagata |
| 6,092,186 A | 7/2000 | Betker et al. |
| 6,122,211 A | 9/2000 | Morgan et al. |
| 6,125,071 A | 9/2000 | Kohno et al. |
| 6,134,164 A | 10/2000 | Lattimore et al. |
| 6,147,514 A | 11/2000 | Shiratake |
| 6,151,244 A | 11/2000 | Fujino et al. |
| 6,157,578 A | 12/2000 | Brady |
| 6,163,862 A | 12/2000 | Adams et al. |
| 6,166,942 A | 12/2000 | Vo et al. |
| 6,172,918 B1 | 1/2001 | Hidaka |
| 6,175,514 B1 | 1/2001 | Henderson |
| 6,181,698 B1 | 1/2001 | Hariguchi |
| 6,208,544 B1 | 3/2001 | Beadle et al. |
| 6,226,215 B1 | 5/2001 | Yoon |
| 6,274,841 B1 | 8/2001 | Ramakrishnan et al. |
| 6,301,153 B1 | 10/2001 | Takeuchi et al. |
| 6,301,164 B1 | 10/2001 | Manning et al. |
| 6,304,477 B1 | 10/2001 | Naji |
| 6,389,507 B1 | 5/2002 | Sherman |
| 6,418,498 B1 | 7/2002 | Martwick |
| 6,466,499 B1 | 10/2002 | Blodgett |
| 6,510,098 B1 | 1/2003 | Taylor |
| 6,563,754 B1 | 5/2003 | Lien et al. |
| 6,578,058 B1 | 6/2003 | Nygaard |
| 6,683,183 B2 | 1/2004 | Kramer |
| 6,731,542 B1 | 5/2004 | Le et al. |
| 6,754,746 B1 | 6/2004 | Leung et al. |
| 6,768,679 B1 | 7/2004 | Le et al. |
| 6,807,614 B2 | 10/2004 | Chung |
| 6,816,422 B2 | 11/2004 | Hamade et al. |
| 6,819,612 B1 | 11/2004 | Achter |
| 6,894,549 B2 | 5/2005 | Eliason |
| 6,943,579 B1 | 9/2005 | Hazanchuk et al. |
| 6,948,056 B1 | 9/2005 | Roth |
| 6,950,771 B1 | 9/2005 | Fan et al. |
| 6,950,898 B2 | 9/2005 | Merritt et al. |
| 6,956,770 B2 | 10/2005 | Khalid et al. |
| 6,961,272 B2 | 11/2005 | Schreck |
| 6,965,648 B1 | 11/2005 | Smith et al. |
| 6,985,394 B2 | 1/2006 | Kim |
| 6,987,693 B2 | 1/2006 | Cernea et al. |
| 7,020,017 B2 | 3/2006 | Chen et al. |
| 7,028,170 B2 | 4/2006 | Saulsbury |
| 7,045,834 B2 | 5/2006 | Tran et al. |
| 7,054,178 B1 | 5/2006 | Shiah et al. |
| 7,058,880 B1 | 6/2006 | Ding et al. |
| 7,061,817 B2 | 6/2006 | Raad et al. |
| 7,079,407 B1 | 7/2006 | Dimitrelis |
| 7,173,857 B2 | 2/2007 | Kato et al. |
| 7,187,585 B2 | 3/2007 | Li et al. |
| 7,196,928 B2 | 3/2007 | Chen |
| 7,260,565 B2 | 8/2007 | Lee et al. |
| 7,260,672 B2 | 8/2007 | Garney |
| 7,372,715 B2 | 5/2008 | Han |
| 7,400,532 B2 | 7/2008 | Aritome |
| 7,406,494 B2 | 7/2008 | Magee |
| 7,447,720 B2 | 11/2008 | Beaumont |
| 7,454,451 B2 | 11/2008 | Beaumont |
| 7,457,181 B2 | 11/2008 | Lee et al. |
| 7,532,529 B2 | 5/2009 | Dadashev et al. |
| 7,535,769 B2 | 5/2009 | Cernea |
| 7,546,438 B2 | 6/2009 | Chung |
| 7,562,198 B2 | 7/2009 | Noda et al. |
| 7,574,466 B2 | 8/2009 | Beaumont |
| 7,602,647 B2 | 10/2009 | Li et al. |
| 7,663,928 B2 | 2/2010 | Tsai et al. |
| 7,685,365 B2 | 3/2010 | Rajwar et al. |
| 7,692,466 B2 | 4/2010 | Ahmadi |
| 7,752,417 B2 | 7/2010 | Manczak et al. |
| 7,791,962 B2 | 9/2010 | Noda et al. |
| 7,796,453 B2 | 9/2010 | Riho et al. |
| 7,805,587 B1 | 9/2010 | Van Dyke et al. |
| 7,808,854 B2 | 10/2010 | Takase |
| 7,827,372 B2 | 11/2010 | Bink et al. |
| 7,869,273 B2 | 1/2011 | Lee et al. |
| 7,898,864 B2 | 3/2011 | Dong |
| 7,924,628 B2 | 4/2011 | Danon et al. |
| 7,933,885 B1 | 4/2011 | Lambiri et al. |
| 7,937,535 B2 | 5/2011 | Ozer et al. |
| 7,957,206 B2 | 6/2011 | Bauser |
| 7,979,667 B2 | 7/2011 | Allen et al. |
| 7,996,749 B2 | 8/2011 | Ding et al. |
| 8,042,082 B2 | 10/2011 | Solomon |
| 8,045,391 B2 | 10/2011 | Mokhlesi |
| 8,059,438 B2 | 11/2011 | Chang et al. |
| 8,095,825 B2 | 1/2012 | Hirotsu et al. |
| 8,117,462 B2 | 2/2012 | Snapp et al. |
| 8,164,942 B2 | 4/2012 | Gebara et al. |
| 8,208,328 B2 | 6/2012 | Hong |
| 8,213,248 B2 | 7/2012 | Moon et al. |
| 8,223,568 B2 | 7/2012 | Seo |
| 8,238,173 B2 * | 8/2012 | Akerib ............... G11C 7/1006 365/191 |
| 8,279,683 B2 | 10/2012 | Klein |
| 8,310,884 B2 | 11/2012 | Iwai et al. |
| 8,332,367 B2 | 12/2012 | Bhattacherjee et al. |
| 8,339,824 B2 | 12/2012 | Cooke |
| 8,339,883 B2 | 12/2012 | Yu et al. |
| 8,347,154 B2 | 1/2013 | Bahali et al. |
| 8,351,292 B2 | 1/2013 | Matano |
| 8,356,144 B2 | 1/2013 | Hessel et al. |
| 8,417,921 B2 | 4/2013 | Gonion et al. |
| 8,462,532 B1 | 6/2013 | Argyres |
| 8,484,276 B2 | 7/2013 | Carlson et al. |
| 8,495,438 B2 | 7/2013 | Roine |
| 8,503,250 B2 | 8/2013 | Demone |
| 8,526,239 B2 | 9/2013 | Kim |
| 8,533,245 B1 | 9/2013 | Cheung |

(56) References Cited

U.S. PATENT DOCUMENTS

| | | | |
|---|---|---|---|
| 8,555,037 B2* | 10/2013 | Gonion | G06F 8/4441 |
| | | | 712/7 |
| 8,589,661 B2* | 11/2013 | Butler | G06F 9/30152 |
| | | | 712/210 |
| 8,599,613 B2 | 12/2013 | Abiko et al. | |
| 8,605,015 B2 | 12/2013 | Guttag et al. | |
| 8,625,376 B2 | 1/2014 | Jung et al. | |
| 8,644,101 B2 | 2/2014 | Jun et al. | |
| 8,650,232 B2 | 2/2014 | Stortz et al. | |
| 8,873,272 B2 | 10/2014 | Lee | |
| 8,964,496 B2 | 2/2015 | Manning | |
| 8,971,124 B1 | 3/2015 | Manning | |
| 9,015,390 B2 | 4/2015 | Klein | |
| 9,047,193 B2 | 6/2015 | Lin et al. | |
| 9,165,023 B2 | 10/2015 | Moskovich et al. | |
| 9,235,414 B2 | 1/2016 | Gopal et al. | |
| 2001/0007112 A1 | 7/2001 | Porterfield | |
| 2001/0008492 A1 | 7/2001 | Higashiho | |
| 2001/0010057 A1 | 7/2001 | Yamada | |
| 2001/0028584 A1 | 10/2001 | Nakayama et al. | |
| 2001/0043089 A1 | 11/2001 | Forbes et al. | |
| 2002/0059355 A1 | 5/2002 | Peleg et al. | |
| 2003/0167426 A1 | 9/2003 | Slobodnik | |
| 2003/0196030 A1 | 10/2003 | Elliott et al. | |
| 2003/0222879 A1 | 12/2003 | Rong et al. | |
| 2004/0073592 A1 | 4/2004 | Kim et al. | |
| 2004/0073773 A1 | 4/2004 | Demjanenko | |
| 2004/0085840 A1 | 5/2004 | Vali et al. | |
| 2004/0095826 A1 | 5/2004 | Perner | |
| 2004/0154002 A1 | 8/2004 | Ball et al. | |
| 2004/0205289 A1 | 10/2004 | Srinivasan | |
| 2004/0215677 A1* | 10/2004 | Beaumont | G06F 9/3001 |
| | | | 708/207 |
| 2004/0233692 A1 | 11/2004 | Ao | |
| 2004/0240251 A1 | 12/2004 | Nozawa et al. | |
| 2005/0015557 A1 | 1/2005 | Wang et al. | |
| 2005/0078514 A1 | 4/2005 | Scheuerlein et al. | |
| 2005/0097417 A1 | 5/2005 | Agrawal et al. | |
| 2006/0047937 A1 | 3/2006 | Selvaggi et al. | |
| 2006/0050569 A1 | 3/2006 | Shimizu | |
| 2006/0069849 A1 | 3/2006 | Rudelic | |
| 2006/0146623 A1 | 7/2006 | Mizuno et al. | |
| 2006/0149804 A1 | 7/2006 | Luick et al. | |
| 2006/0181917 A1 | 8/2006 | Kang et al. | |
| 2006/0215432 A1 | 9/2006 | Wickeraad et al. | |
| 2006/0225072 A1 | 10/2006 | Lari et al. | |
| 2006/0291282 A1 | 12/2006 | Liu et al. | |
| 2007/0103986 A1 | 5/2007 | Chen | |
| 2007/0171747 A1 | 7/2007 | Hunter et al. | |
| 2007/0180006 A1 | 8/2007 | Gyoten et al. | |
| 2007/0180184 A1 | 8/2007 | Sakashita et al. | |
| 2007/0195602 A1 | 8/2007 | Fong et al. | |
| 2007/0285131 A1 | 12/2007 | Sohn | |
| 2007/0285979 A1 | 12/2007 | Turner | |
| 2007/0291532 A1 | 12/2007 | Tsuji | |
| 2008/0025073 A1 | 1/2008 | Arsovski | |
| 2008/0037333 A1 | 2/2008 | Kim et al. | |
| 2008/0052711 A1 | 2/2008 | Forin et al. | |
| 2008/0137388 A1 | 6/2008 | Krishnan et al. | |
| 2008/0165601 A1 | 7/2008 | Matick et al. | |
| 2008/0178053 A1 | 7/2008 | Gorman et al. | |
| 2008/0215937 A1 | 9/2008 | Dreibelbis et al. | |
| 2009/0067218 A1 | 3/2009 | Graber | |
| 2009/0141529 A1 | 6/2009 | Arsovski et al. | |
| 2009/0154238 A1 | 6/2009 | Lee | |
| 2009/0154273 A1 | 6/2009 | Borot et al. | |
| 2009/0254697 A1 | 10/2009 | Akerib | |
| 2010/0067296 A1 | 3/2010 | Li | |
| 2010/0091582 A1 | 4/2010 | Vali et al. | |
| 2010/0172190 A1 | 7/2010 | Lavi et al. | |
| 2010/0210076 A1 | 8/2010 | Gruber et al. | |
| 2010/0226183 A1 | 9/2010 | Kim | |
| 2010/0308858 A1 | 12/2010 | Noda et al. | |
| 2010/0332895 A1 | 12/2010 | Billing et al. | |
| 2011/0019491 A1 | 1/2011 | Kurjanowicz et al. | |
| 2011/0051523 A1 | 3/2011 | Manabe et al. | |
| 2011/0063919 A1 | 3/2011 | Chandrasekhar et al. | |
| 2011/0093662 A1 | 4/2011 | Walker et al. | |
| 2011/0103151 A1 | 5/2011 | Kim et al. | |
| 2011/0119467 A1 | 5/2011 | Cadambi et al. | |
| 2011/0122695 A1 | 5/2011 | Li et al. | |
| 2011/0140741 A1 | 6/2011 | Zerbe et al. | |
| 2011/0142419 A1 | 6/2011 | Zou et al. | |
| 2011/0219260 A1 | 9/2011 | Nobunaga et al. | |
| 2011/0267883 A1 | 11/2011 | Lee et al. | |
| 2011/0317496 A1 | 12/2011 | Bunce et al. | |
| 2012/0005397 A1 | 1/2012 | Lim et al. | |
| 2012/0017039 A1 | 1/2012 | Margetts | |
| 2012/0023281 A1 | 1/2012 | Kawasaki et al. | |
| 2012/0120705 A1 | 5/2012 | Mitsubori et al. | |
| 2012/0134216 A1 | 5/2012 | Singh | |
| 2012/0134226 A1 | 5/2012 | Chow | |
| 2012/0135225 A1 | 5/2012 | Chow | |
| 2012/0140540 A1 | 6/2012 | Agam et al. | |
| 2012/0182798 A1 | 7/2012 | Hosono et al. | |
| 2012/0195146 A1 | 8/2012 | Jun et al. | |
| 2012/0198310 A1 | 8/2012 | Tran et al. | |
| 2012/0246380 A1 | 9/2012 | Akerib et al. | |
| 2012/0265964 A1 | 10/2012 | Murata et al. | |
| 2012/0281486 A1 | 11/2012 | Rao et al. | |
| 2012/0303627 A1 | 11/2012 | Keeton et al. | |
| 2013/0003467 A1 | 1/2013 | Klein | |
| 2013/0061006 A1 | 3/2013 | Hein | |
| 2013/0107623 A1 | 5/2013 | Kavalipurapu et al. | |
| 2013/0117541 A1 | 5/2013 | Choquette et al. | |
| 2013/0124783 A1 | 5/2013 | Yoon et al. | |
| 2013/0132702 A1 | 5/2013 | Patel et al. | |
| 2013/0138646 A1 | 5/2013 | Sirer et al. | |
| 2013/0163362 A1 | 6/2013 | Kim | |
| 2013/0173888 A1 | 7/2013 | Hansen et al. | |
| 2013/0205114 A1 | 8/2013 | Badam et al. | |
| 2013/0219112 A1 | 8/2013 | Okin et al. | |
| 2013/0227361 A1 | 8/2013 | Bowers et al. | |
| 2013/0283122 A1 | 10/2013 | Anholt et al. | |
| 2013/0286705 A1 | 10/2013 | Grover et al. | |
| 2013/0326154 A1 | 12/2013 | Haswell | |
| 2013/0332707 A1 | 12/2013 | Gueron et al. | |
| 2014/0185395 A1 | 7/2014 | Seo | |
| 2014/0215185 A1 | 7/2014 | Danielsen | |
| 2014/0247673 A1 | 9/2014 | Muralimanohar et al. | |
| 2014/0250279 A1 | 9/2014 | Manning | |
| 2014/0281371 A1 | 9/2014 | Thantry et al. | |
| 2014/0344934 A1 | 11/2014 | Jorgensen | |
| 2015/0029798 A1 | 1/2015 | Manning | |
| 2015/0042380 A1 | 2/2015 | Manning | |
| 2015/0063052 A1 | 3/2015 | Manning | |
| 2015/0078108 A1 | 3/2015 | Cowles et al. | |
| 2015/0089166 A1 | 3/2015 | Kogge | |
| 2015/0120987 A1 | 4/2015 | Wheeler | |
| 2015/0134713 A1 | 5/2015 | Wheeler | |
| 2015/0270015 A1 | 9/2015 | Murphy et al. | |
| 2015/0279466 A1* | 10/2015 | Manning | G11C 7/1006 |
| | | | 365/49.17 |
| 2015/0324290 A1 | 11/2015 | Leidel | |
| 2015/0325272 A1 | 11/2015 | Murphy | |
| 2015/0356009 A1 | 12/2015 | Wheeler et al. | |
| 2015/0356022 A1 | 12/2015 | Leidel et al. | |
| 2015/0357007 A1 | 12/2015 | Manning et al. | |
| 2015/0357008 A1 | 12/2015 | Manning et al. | |
| 2015/0357019 A1 | 12/2015 | Wheeler et al. | |
| 2015/0357020 A1 | 12/2015 | Manning | |
| 2015/0357021 A1 | 12/2015 | Hush | |
| 2015/0357022 A1 | 12/2015 | Hush | |
| 2015/0357023 A1 | 12/2015 | Hush | |
| 2015/0357024 A1 | 12/2015 | Hush et al. | |
| 2015/0357047 A1 | 12/2015 | Tiwari | |
| 2016/0062672 A1 | 3/2016 | Wheeler | |
| 2016/0062673 A1 | 3/2016 | Tiwari | |
| 2016/0062692 A1 | 3/2016 | Finkbeiner et al. | |
| 2016/0062733 A1 | 3/2016 | Tiwari | |
| 2016/0063284 A1 | 3/2016 | Tiwari | |
| 2016/0064045 A1 | 3/2016 | La Fratta | |
| 2016/0064047 A1 | 3/2016 | Tiwari | |
| 2016/0098208 A1 | 4/2016 | Willcock | |

(56) References Cited

U.S. PATENT DOCUMENTS

| | | |
|---|---|---|
| 2016/0098209 A1 | 4/2016 | Leidel et al. |
| 2016/0110135 A1 | 4/2016 | Wheeler et al. |
| 2016/0125919 A1 | 5/2016 | Hush |
| 2016/0154596 A1 | 6/2016 | Willcock et al. |
| 2016/0155482 A1 | 6/2016 | La Fratta |
| 2016/0188250 A1 | 6/2016 | Wheeler |
| 2016/0196142 A1 | 7/2016 | Wheeler et al. |
| 2016/0196856 A1 | 7/2016 | Tiwari et al. |
| 2016/0225422 A1 | 8/2016 | Tiwari et al. |
| 2018/0175862 A1 | 6/2018 | Asadi et al. |

FOREIGN PATENT DOCUMENTS

| | | |
|---|---|---|
| EP | 2026209 | 2/2009 |
| JP | H0831168 | 2/1996 |
| JP | 2009259193 | 3/2015 |
| KR | 10-0211482 | 8/1998 |
| KR | 100821616 | 4/2008 |
| KR | 10-2010-0134235 | 12/2010 |
| KR | 10-2013-0049421 | 5/2013 |
| TW | 485601 | 5/2002 |
| TW | 200532708 | 10/2005 |
| TW | 201218070 | 5/2012 |
| TW | 201346724 | 11/2013 |
| WO | 2001065359 | 9/2001 |
| WO | 2010079451 | 7/2010 |
| WO | 2013062596 | 5/2013 |
| WO | 2013081588 | 6/2013 |
| WO | 2013095592 | 6/2013 |

OTHER PUBLICATIONS

Stojmenovic, "Multiplicative Circulant Networks Topological Properties and Communication Algorithms", (25 pgs.), Discrete Applied Mathematics 77 (1997) 281-305.

Boyd et al., "On the General Applicability of Instruction-Set Randomization", Jul.-Sep. 2010, (14 pgs.), vol. 7, Issue 3, IEEE Transactions on Dependable and Secure Computing.

Elliot, et al., "Computational RAM: Implementing Processors in Memory", Jan.-Mar. 1999, (10 pgs.), vol. 16, Issue 1, IEEE Design and Test of Computers Magazine.

Warren Jr., Henry S., "Hacker's Delight", Second Edition, Oct. 2013, pp. 181-184 and 194.

Dybdahl, et al., "Destructive-Read in Embedded DRAM, Impact on Power Consumption," Apr. 2006, (10 pgs.), vol. 2, Issue 2, Journal of Embedded Computing-Issues in embedded single-chip multicore architectures.

Kogge, et al., "Processing In Memory: Chips to Petaflops," May 23, 1997, (8 pgs.), retrieved from: http://www.cs.ucf.edu/courses/cda5106/summer02/papers/kogge97PIM.pdf.

Draper, et al., "The Architecture of the DIVA Processing-In-Memory Chip," Jun. 22-26, 2002, (12 pgs.), ICS '02, retrieved from: http://www.isi.edu/~draper/papers/ics02.pdf.

Adibi, et al., "Processing-In-Memory Technology for Knowledge Discovery Algorithms," Jun. 25, 2006, (10 pgs.), Proceeding of the Second International Workshop on Data Management on New Hardware, retrieved from: http://www.cs.cmu.edu/~damon2006/pdf/adibi06inmemory.pdf.

U.S. Appl. No. 13/449,082, entitled, "Methods and Apparatus for Pattern Matching," filed Apr. 17, 2012, (37 pgs.).

U.S. Appl. No. 13/743,686, entitled, "Weighted Search and Compare in a Memory Device," filed Jan. 17, 2013, (25 pgs.).

U.S. Appl. No. 13/774,636, entitled, "Memory as a Programmable Logic Device," filed Feb. 22, 2013, (30 pgs.).

U.S. Appl. No. 13/774,553, entitled, "Neural Network in a Memory Device," filed Feb. 22, 2013, (63 pgs.).

U.S. Appl. No. 13/796,189, entitled, "Performing Complex Arithmetic Functions in a Memory Device," filed Mar. 12, 2013, (23 pgs.).

International Search Report and Written Opinion for PCT Application No. PCT/US2013/043702, dated Sep. 26, 2013, (11 pgs.).

Pagiamtzis, et al., "Content-Addressable Memory (CAM) Circuits and Architectures: A Tutorial and Survey", Mar. 2006, (16 pgs.), vol. 41, No. 3, IEEE Journal of Solid-State Circuits.

Pagiamtzis, Kostas, "Content-Addressable Memory Introduction", Jun. 25, 2007, (6 pgs.), retrieved from: http://www.pagiamtzis.com/cam/camintro.

Debnath, Biplob, Bloomflash: Bloom Filter on Flash-Based Storage, 2011 31st Annual Conference on Distributed Computing Systems, Jun. 20-24, 2011, 10 pgs.

Derby, et al., "A High-Performance Embedded DSP Core with Novel SIMD Features", Apr. 6-10, 2003, (4 pgs), vol. 2, pp. 301-304, 2003 IEEE International Conference on Accoustics, Speech, and Signal Processing.

\* cited by examiner

| | COMP_COMP 431 | INVERTED ELEMENTS 433 | BOUNDARY 435 | ELEMENT MASK 437 | LSB 439 | TMP 441 | RESULT 443 | ELEMENTS 445 |
|---|---|---|---|---|---|---|---|---|
| 451-1 | | | | | | | | 0xABCDEF12 |
| 451-2 | 0x543210ED | 0x543210ED | | | | | 0x00000000 | 0xABCDEF12 |
| 451-3 | 0x88888888 | 0x543210ED | 0x88888888 | | | | 0x00000000 | 0xABCDEF12 |
| 451-4 | 0xFFFFFFFF | 0x543210ED | 0x88888888 | 0xFFFFFFFF | | | 0x00000000 | 0xABCDEF12 |
| 451-5.1.a | 0x88888888 | 0x543210ED | 0x88888888 | 0xFFFFFFFF | | | 0x00000000 | 0xABCDEF12 |
| 451-5.1.b | 0x88888888 | 0x543210ED | 0x88888888 | 0xFFFFFFFF | | | 0x00000000 | 0xABCDEF12 |
| 451-5.1.c | 0x00000088 | 0x543210ED | 0x88888888 | 0xFFFFFFFF | | | 0x00000000 | 0xABCDEF12 |
| 451-5.1.d | 0x00000088 | 0x543210ED | 0x88888888 | 0xFFFFFFFF | | | 0x00000088 | 0xABCDEF12 |
| 451-5.1.e.i | 0x11111111 | 0x543210ED | 0x88888888 | 0xFFFFFFFF | 0x11111111 | | 0x00000088 | 0xABCDEF12 |
| 451-5.1.e.ii | 0x000000FF | 0x543210ED | 0x88888888 | 0xFFFFFFFF | 0x11111111 | 0x000000FF | 0x00000088 | 0xABCDEF12 |
| 451-5.1.e.iii | 0x000000FF | 0x543210ED | 0x88888888 | 0x000000FF | 0x11111111 | 0x000000FF | 0x00000088 | 0xABCDEF12 |
| 451-5.2.a | 0x88888888 | 0x543210ED | 0x88888888 | 0x000000FF | 0x11111111 | 0x000000FF | 0x00000088 | 0xABCDEF12 |
| 451-5.2.b | 0x00000044 | 0x543210ED | 0x88888888 | 0x000000FF | 0x11111111 | 0x000000FF | 0x00000088 | 0xABCDEF12 |
| 451-5.2.c | 0x00000044 | 0x543210ED | 0x88888888 | 0x000000FF | 0x11111111 | 0x000000FF | 0x00000088 | 0xABCDEF12 |
| 451-5.2.d | 0x00000044 | 0x543210ED | 0x88888888 | 0x000000FF | 0x11111111 | 0x000000FF | 0x00000044 | 0xABCDEF12 |
| 451-5.2.e.i | 0x11111111 | 0x543210ED | 0x88888888 | 0x000000FF | 0x11111111 | 0x000000FF | 0x00000044 | 0xABCDEF12 |
| 451-5.2.e.ii | 0x000000FF | 0x543210ED | 0x88888888 | 0x000000FF | 0x11111111 | 0x000000FF | 0x00000044 | 0xABCDEF12 |
| 451-5.2.e.iii | 0x000000FF | 0x543210ED | 0x88888888 | 0x000000FF | 0x11111111 | 0x000000FF | 0x00000044 | 0xABCDEF12 |

| | 431 | 433 | 435 | 437 | 439 | 441 | 443 | 445 |
|---|---|---|---|---|---|---|---|---|
| 451-5.3.a | 0x88888888 | 0x543210ED | 0x88888888 | 0x000000FF | 0x11111111 | 0x000000FF | 0x00000044 | 0xABCDEF12 |
| 451-5.3.b | 0x00000022 | 0x543210ED | 0x88888888 | 0x000000FF | 0x11111111 | 0x000000FF | 0x00000044 | 0xABCDEF12 |
| 451-5.3.c | 0x00000020 | 0x543210ED | 0x88888888 | 0x000000FF | 0x11111111 | 0x000000FF | 0x00000044 | 0xABCDEF12 |
| 451-5.3.d | 0x00000020 | 0x543210ED | 0x88888888 | 0x000000FF | 0x11111111 | 0x000000FF | 0x00000020 | 0xABCDEF12 |
| 451-5.3.e.i | 0x00000020 | 0x543210ED | 0x88888888 | 0x000000FF | 0x11111111 | 0x000000FF | 0x00000020 | 0xABCDEF12 |
| 451-5.3.e.ii | 0x000000F0 | 0x543210ED | 0x88888888 | 0x000000FF | 0x11111111 | 0x000000F0 | 0x00000020 | 0xABCDEF12 |
| 451-5.3.e.iii | 0x000000F0 | 0x543210ED | 0x88888888 | 0x000000F0 | 0x11111111 | 0x000000F0 | 0x00000020 | 0xABCDEF12 |
| 451-5.4.a | 0x88888888 | 0x543210ED | 0x88888888 | 0x000000F0 | 0x11111111 | 0x000000F0 | 0x00000020 | 0xABCDEF12 |
| 451-5.4.b | 0x00000010 | 0x543210ED | 0x88888888 | 0x000000F0 | 0x11111111 | 0x000000F0 | 0x00000020 | 0xABCDEF12 |
| 451-5.4.c | 0x00000000 | 0x543210ED | 0x88888888 | 0x000000F0 | 0x11111111 | 0x000000F0 | 0x00000000 | 0xABCDEF12 |
| 451-5.4.d | 0x00000000 | 0x543210ED | 0x88888888 | 0x000000F0 | 0x11111111 | 0x000000F0 | 0x00000000 | 0xABCDEF12 |
| 451-5.4.e.i | 0x00000000 | 0x543210ED | 0x88888888 | 0x000000F0 | 0x11111111 | 0x000000F0 | 0x00000000 | 0xABCDEF12 |
| 451-5.4.e.ii | 0x000000F0 | 0x543210ED | 0x88888888 | 0x000000F0 | 0x11111111 | 0x000000F0 | 0x00000000 | 0xABCDEF12 |
| 451-5.4.e.iii | 0x00000000 | 0x543210ED | 0x88888888 | 0x000000F0 | 0x11111111 | 0x000000F0 | 0x00000000 | |
| 451-6 | 0x00000000 | | | | | 0x000000F0 | 0x000000F0 | 0xABCDEF12 |

*Fig. 4 (cont)*

|  | 531 | 561 | 563 | 565 | 567 |
|---|---|---|---|---|---|
|  | COMP_COMP | A | B | B' | C |
| 553-0 | 0000 | 0010 | 0001 | 0000 | 0000 |
| 553-1 | 0000 | 0010 | 0001 | 1110 | 0000 |
| 553-2 | 0000 | 0010 | 0001 | 1110 | 0000 |
| 553-3 | 1111 | 0010 | 0001 | 1110 | 0000 |
| 553-3a | 1111 | 0010 | 0001 | 1110 | 1111 |
| 553-4 | 1111 | 0010 | 0001 | 1110 | 1111 |

*Fig. 5A*

|  | 562 | 564 | 566 | 568 |
|---|---|---|---|---|
|  | CARRY | A | B | C |
| 555-0 | 0000 | 0010 | 0001 | 0000 |
| 555-1.1 | 0000 | 0010 | 0001 | 0001 |
| 555-1.1a | 0000 | 0010 | 0001 | 0001 |
| 555-1.2 | 0000 | 0010 | 0001 | 0011 |
| 555-1.2a | 0000 | 0010 | 0001 | 0011 |
| 555-1.3 | 0000 | 0010 | 0001 | 0011 |
| 555-1.3a | 0000 | 0010 | 0001 | 0011 |
| 555-1.4 | 0000 | 0010 | 0001 | 0011 |
| 555-1.4a | 0000 | 0010 | 0001 | 0011 |

*Fig. 5B*

SMALLEST OR LARGEST VALUE ELEMENT DETERMINATION

PRIORITY INFORMATION

This application is a Continuation of U.S. application Ser. No. 15/237,085, filed Aug. 15, 2016, which issues as U.S. Pat. No. 11,029,951 on Jun. 8, 2021, the contents of which are included herein by reference.

TECHNICAL FIELD

The present disclosure relates generally to semiconductor memory apparatuses and methods, and more particularly, to apparatuses and methods related to smallest value element or largest value element determination in memory.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Electronic systems often include a number of processing resources (e.g., one or more processors), which may retrieve and execute instructions and store the results of the executed instructions to a suitable location. A processor can comprise a number of functional units (e.g., herein referred to as functional unit circuitry such as arithmetic logic unit (ALU) circuitry, floating point unit (FPU) circuitry, and/or a combinatorial logic block, for example, which can execute instructions to perform logical operations such as AND, OR, NOT, NAND, NOR, and XOR logical operations on data (e.g., one or more operands).

A number of components in an electronic system may be involved in providing instructions to the functional unit circuitry for execution. The instructions may be generated, for instance, by a processing resource such as a controller and/or host processor. Data (e.g., the operands on which the instructions will be executed to perform the logical operations) may be stored in a memory array that is accessible by the functional unit circuitry. The instructions and/or data may be retrieved from the memory array and sequenced and/or buffered before the functional unit circuitry begins to execute instructions on the data. Furthermore, as different types of operations may be executed in one or multiple clock cycles through the functional unit circuitry, intermediate results of the operations and/or data may also be sequenced and/or buffered.

In many instances, the processing resources (e.g., processor and/or associated functional unit circuitry) may be external to the memory array, and data can be accessed (e.g., via a bus between the processing resources and the memory array) to execute instructions. Data can be transferred from the memory array to registers external to the memory array via a bus.

BRIEF DESCRIPTION OF THE DRAWINGS

FIG. 4 is a table illustrating the state of memory cells of an array at a particular phase associated with determining a smallest value element in accordance with a number of embodiments of the present disclosure.

FIG. 5A illustrates a table showing the states of memory cells of an array at a particular phase associated with determining a smallest value element in accordance with a number of embodiments of the present disclosure.

FIG. 5B illustrates a table showing the states of memory cells of an array at a particular phase associated with determining a smallest value element in accordance with a number of embodiments of the present disclosure.

DETAILED DESCRIPTION

Figure 1:
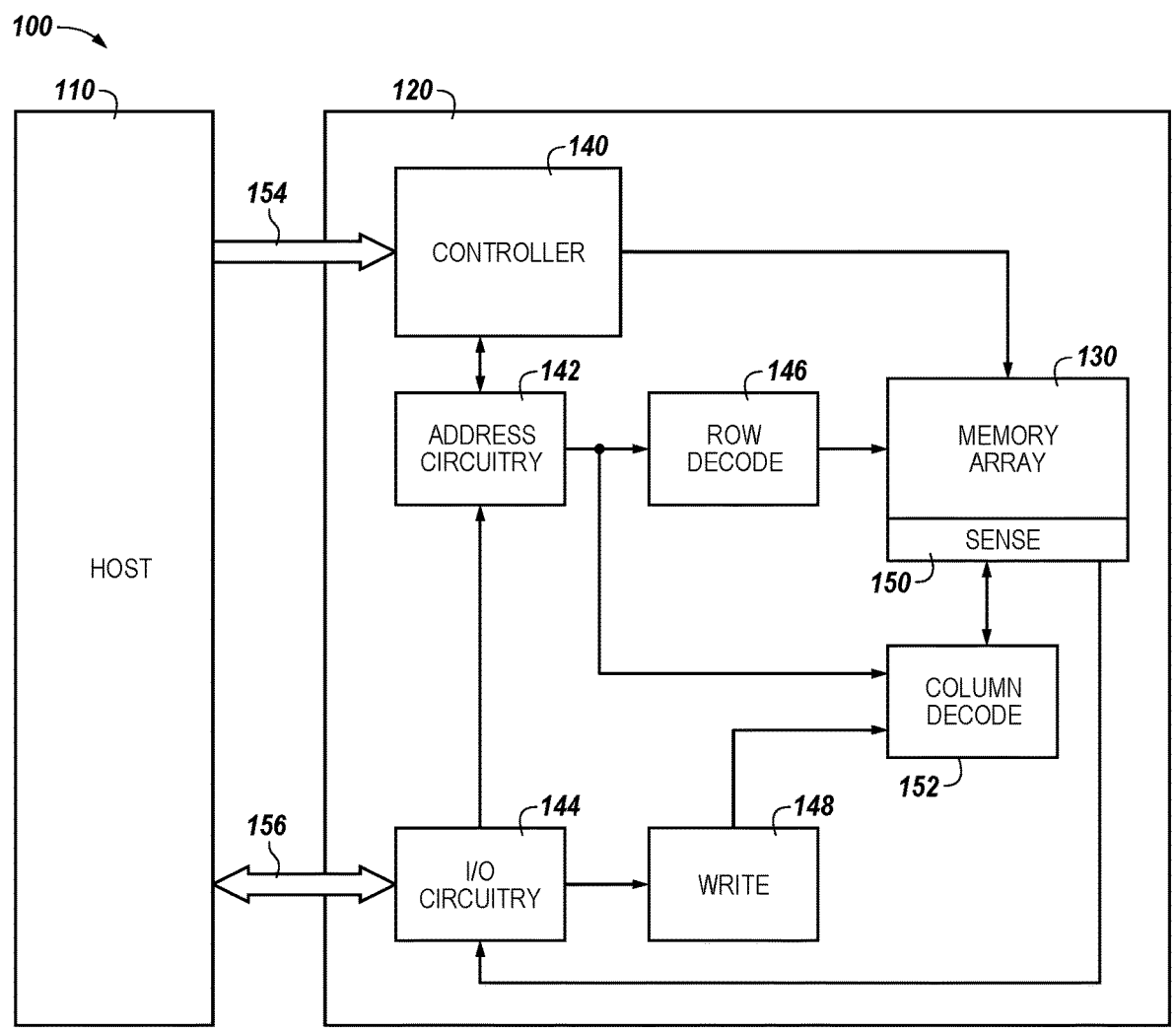
FIG. 1 is a block diagram of an apparatus in the form of a computing system including a memory device in accordance with a number of embodiments of the present disclosure.

The present disclosure includes apparatuses and methods related to smallest and largest value element determination in memory. An example method comprises: storing an elements vector comprising a plurality of elements in a group of memory cells coupled to an access line of an array; performing, using sensing circuitry coupled to the array, a logical operation using a first vector and a second vector as inputs, with a result of the logical operation being stored in the array as a result vector; updating the result vector responsive to performing a plurality of subsequent logical operations using the sensing circuitry; and providing an indication of which of the plurality of elements have one of a smallest value and a largest value.

In a number of examples, an element can represent an object and/or other construct, which may be stored in memory as a vector (e.g., a bit-vector). A vector can include a plurality of elements, and the elements can comprise a number of data units (e.g., bits) and can have respective values (e.g., numerical values). An elements vector can comprise a plurality of elements, which may be stored as respective bit-vectors. As an example, a plurality of elements can be stored (e.g., as an elements bit-vector) in memory cells coupled to a particular access line (e.g., a row) of a memory array. A size (e.g., width or length) of the respective elements corresponding to an elements bit-vector can be the same or different. For example the constituent elements of a particular elements bit-vector may comprise a same quantity of bits, or one or more of the constituent elements may comprise different quantities of bits. As used herein, the terms "length" and "width" may be used interchangeably to refer to the size (e.g., quantity of bits) of a bit-vector.

A number of embodiments of the present disclosure can provide benefits such as a reduction in the number of operations (e.g., computations) and/or time involved in determining a smallest value element or a largest value element among a plurality of elements, as compared to previous approaches. As an example, a number of embodiments can include creating a mask indicating which element(s) has(have) a smallest value or a largest value among a plurality of elements. A number of embodiments can include performing various operations in parallel (e.g., simultaneously) on the plurality of elements, which can reduce power consumption as compared to previous approaches. In accordance with a number of embodiments, a smallest value element or a largest value element among a plurality of elements stored in a memory array can be determined by performing a number of logical operations without transferring data out of the memory array and/or sensing circuitry via a bus (e.g., data bus, address bus, control bus, etc.).

In various previous approaches, elements (e.g., a first element having a first value and a second element having a second value) may have been transferred from the array and sensing circuitry to a number of registers via a bus comprising input/output (I/O) lines, for instance. The number of registers can be used by a processing resource such as a processor, microprocessor, and/or compute engine, which may comprise ALU circuitry and/or other functional unit circuitry configured to perform the appropriate logical operations to determine which of the elements has a smallest value or a largest value. However, often such ALU circuitry may not be capable of determining which elements of multiple elements have a smallest value or a largest value. Also, transferring data to/from memory from/to registers via a bus can involve significant power consumption and time requirements. Even if the processing resource is located on a same chip as the memory array, significant power can be consumed in moving data out of the array to the compute circuitry (e.g., ALU). For instance, moving the data from the memory array to the processing resource can include performing a sense line address access (e.g., firing of a column decode signal) in order to transfer data from sense lines onto I/O lines, moving the data to the array periphery, and providing the data to a register in association with creating a mask indicating those elements having a smallest value or a largest value.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designators "n", "S," "T," "U," "V," "W," etc., particularly with respect to reference numerals in the drawings, indicates that a number of the particular feature so designated can be included. As used herein, "a number of" a particular thing can refer to one or more of such things (e.g., a number of memory arrays can refer to one or more memory arrays).

The figures herein follow a numbering convention in which the first digit or digits correspond to the drawing figure number and the remaining digits identify an element or component in the drawing. Similar elements or components between different figures may be identified by the use of similar digits. For example, 231 may reference element "31" in FIG. 2A, and a similar element may be referenced as 331 in FIG. 3. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a block diagram of an apparatus in the form of a computing system 100 including a memory device 120 in accordance with a number of embodiments of the present disclosure. As used herein, a memory device 120, controller 140, channel controller 143, memory array 130, and sensing circuitry 150 might also be separately considered an "apparatus."

System 100 includes a host 110 coupled (e.g., connected) to memory device 120, which includes a memory array 130. Host 110 can be a host system such as a personal laptop computer, a desktop computer, a digital camera, a smart phone, or a memory card reader, among various other types of hosts. Host 110 can include a system motherboard and/or backplane and can include a number of processing resources (e.g., one or more processors, microprocessors, or some other type of controlling circuitry). The system 100 can include separate integrated circuits or both the host 110 and the memory device 120 can be part of a same integrated circuit. The system 100 can be, for instance, a server system and/or a high performance computing (HPC) system and/or a portion thereof. Although the example shown in FIG. 1 illustrates a system having a Von Neumann architecture, embodiments of the present disclosure can be performed in non-Von Neumann architectures, which may not include one or more components (e.g., CPU, ALU, etc.) often associated with a Von Neumann architecture.

For clarity, the system 100 has been simplified to focus on features with particular relevance to the present disclosure. The memory array 130 can be a DRAM array, SRAM array, STT RAM array, PCRAM array, TRAM array, RRAM array, NAND flash array, and/or NOR flash array, for instance. The array 130 can comprise memory cells arranged in rows coupled by access lines (which may be referred to herein as word lines or select lines) and columns coupled by sense lines, which may be referred to herein as data lines or digit lines. Although a single array 130 is shown in FIG. 1, embodiments are not so limited. For instance, memory device 120 may include a number of arrays 130 (e.g., a number of banks of DRAM cells, NAND flash cells, etc.).

The memory device 120 includes address circuitry 142 to latch address signals provided over a bus 156 (e.g., a combined address and I/O bus) through I/O circuitry 144. Address signals are received through address circuitry 142 and decoded by a row decoder 146 and a column decoder 152 to access the memory array 130. The address signals can also be provided to controller 140 (e.g., via address circuitry 142 and/or via a control bus 154). Data can be read from memory array 130 by sensing voltage and/or current changes on the data lines using sensing circuitry 150. The sensing circuitry 150 can read and latch data (e.g., pages of data) from the memory array 130. The I/O circuitry 144 can be used for bi-directional data communication with host 110 over the bus 156. The write circuitry 148 is used to write data to the memory array 130.

Controller 140, which may be referred to as bank control logic and/or a sequencer, decodes signals provided by control bus 154 from the host 110 and/or a channel controller (not shown). These signals can include chip enable signals, write enable signals, and address latch signals that are used to control operations performed on the memory array 130, including data read, data write, and data erase operations. In various embodiments, the controller 140 is responsible for executing instructions from the host 110 and sequencing access to the array 130. The memory controller 140 can be a state machine, a sequencer, or some other type of controller. The controller 140 can control shifting data (e.g., right or left) in an array (e.g., memory array 130), as well as determining a smallest value element or a largest value element in accordance with a number of embodiments described herein.

Examples of the sensing circuitry 150 can comprise a number of sensing components that each may comprise a sense amplifier and a corresponding compute component, which may serve as, and be referred to herein as, an accumulator and can be used to perform logical operations (e.g., on data associated with complementary data lines). The sensing components can serve as respective processing elements (e.g., 1-bit processors) on a per column basis, which can provide the ability to perform operations in a SIMD (single instruction multiple data) manner, as described further below.

In a number of embodiments, the sensing circuitry 150 can be used to perform logical operations using data stored in array 130 as inputs and store the results of the logical operations back to the array 130 without transferring data via a sense line address access (e.g., without firing a column decode signal). As such, various operations (e.g., a number of logical operations that may be performed as part of a compute function, such as a function for determining a result of a mathematical computation), can be performed using, and within, sensing circuitry 150 rather than (or in association with) being performed by processing resources external to the sensing circuitry (e.g., by a processor associated with host 110 and/or other processing circuitry, such as ALU circuitry, located on device 120 (e.g., on controller 140 or elsewhere)).

In various previous approaches, data associated with an operand, for instance, would be read from memory via sensing circuitry and provided to external ALU circuitry via I/O lines (e.g., via local I/O lines and/or global I/O lines). The external ALU circuitry could include a number of registers and would perform compute functions using the operands, and the result would be transferred back to the array via the I/O lines. In contrast, in a number of embodiments of the present disclosure, sensing circuitry 150 is configured to perform logical operations on data stored in memory array 130 and store the result back to the memory array 130 without enabling an I/O line (e.g., a local I/O line) coupled to the sensing circuitry 150. The sensing circuitry 150 can conform to pitch rules associated with the array. For example, the memory cells of a memory array may have a $4F^2$ or $6F^2$ cell size, with "F" being a feature size. The devices (e.g., logic gates) associated with ALU circuitry of previous systems may not be capable of being formed on pitch with the memory cells (e.g., on a same pitch as the sense lines), which can affect chip size and/or memory density, for example.

A number of embodiments of the present disclosure can include the sensing circuitry 150 (e.g., including sense amplifiers and/or compute components) being formed on pitch with the memory cells of the array. For instance, the sensing circuitry 150 described herein can be formed on a same pitch as a pair of complementary sense lines. As an example, the memory cells of an array may have a cell size of $6F^2$ (e.g., 3F×2F). If the pitch of a pair of complementary sense lines of the array is 3F, then the sensing circuitry being on pitch indicates the sensing circuitry (e.g., the transistors corresponding to the sense amplifier and corresponding compute component per respective pair of complementary sense lines) is formed to fit within the 3F pitch of the complementary sense lines.

As such, in a number of embodiments, circuitry external to array 130 and sensing circuitry 150 is not needed to perform compute functions as the sensing circuitry 150 can be controlled to perform the appropriate logical operations used to perform such compute functions without the use of an external processing resource. Therefore, the sensing circuitry 150 may be used to complement and/or to replace, at least to some extent, such an external processing resource (or at least the bandwidth consumption of such an external processing resource).

However, in a number of embodiments, the sensing circuitry 150 may be used to perform logical operations (e.g., to execute instructions) in addition to logical operations performed by an external processing resource (e.g., host 110). For instance, host 110 and/or sensing circuitry 150 may be limited to performing only certain logical operations and/or a certain number of logical operations.

Figure 3:
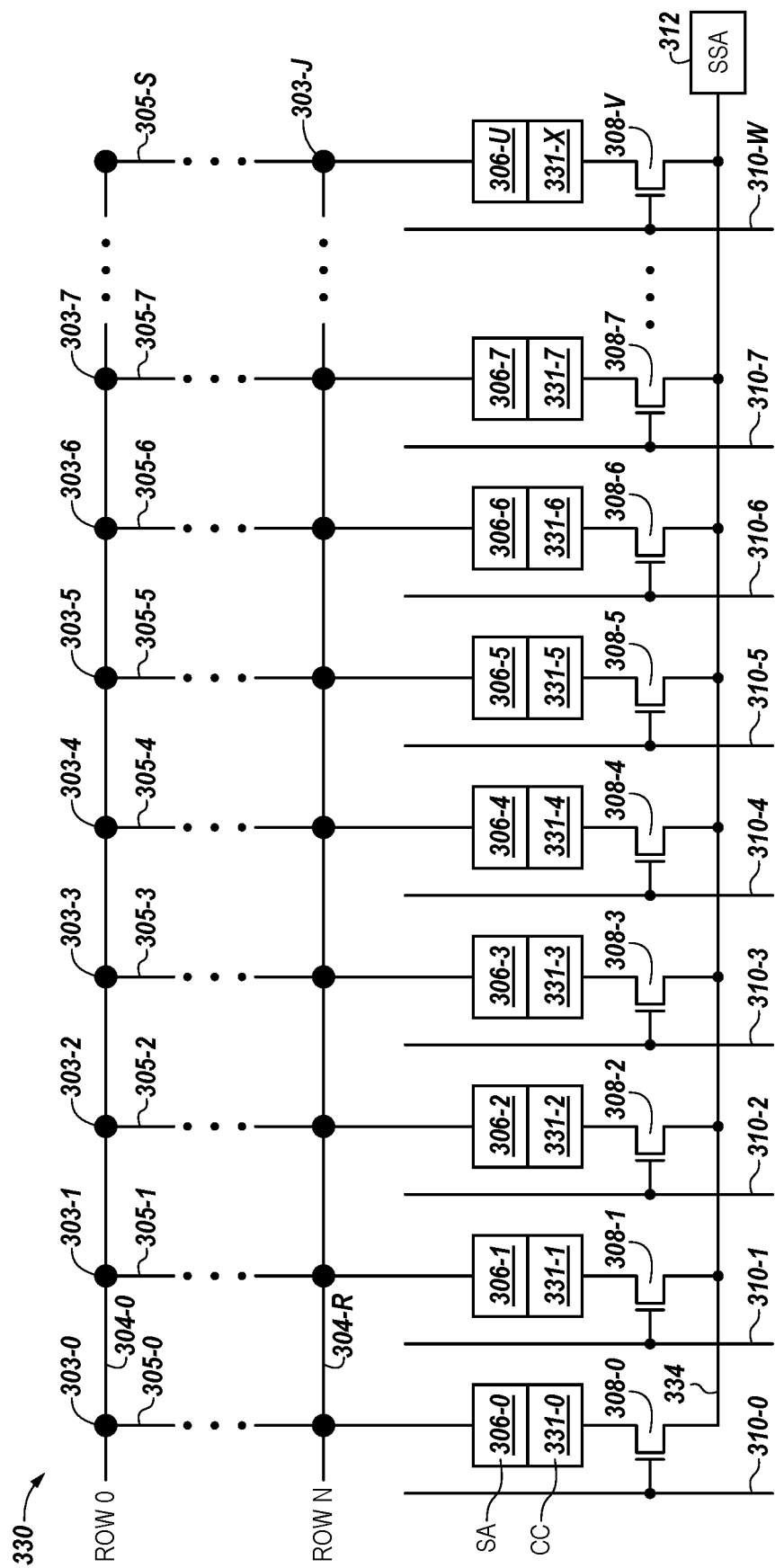
FIG. 3 is a schematic diagram of a portion of a memory array in accordance with a number of embodiments of the present disclosure

Enabling an I/O line can include enabling (e.g., turning on) a transistor having a gate coupled to a decode signal (e.g., a column decode signal provided to a column decode line such as column decode line 310-1 to 310-W shown in FIG. 3) and a source/drain coupled to the I/O line (e.g., I/O line 334 shown in FIG. 3). However, embodiments are not limited to not enabling an I/O line. For instance, in a number of embodiments, sensing circuitry (e.g., 150) can be used to perform logical operations without enabling column decode lines of the array; however, the local I/O line(s) may be enabled in order to transfer a result to a suitable location other than back to the array 130 (e.g., to a secondary sense amplifier such as SSA 312 shown in FIG. 3, to an external register, etc.). As used herein, transferring data, which may also be referred to as moving data is an inclusive term that can include, for example, copying data from a source location to a destination location and/or moving data from a source location to a destination location without necessarily maintaining a copy of the data at the source location.

Figure 2A:
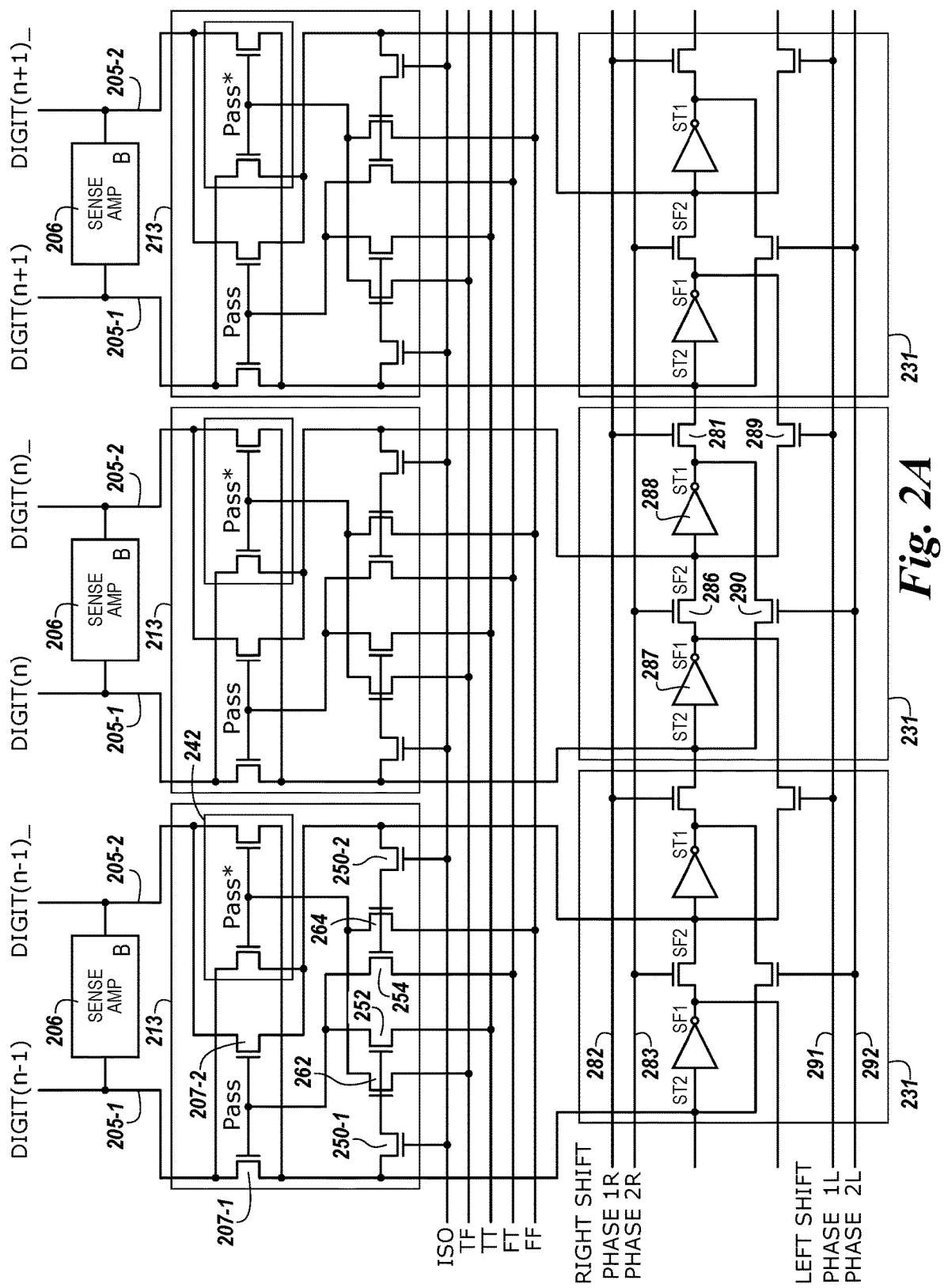
FIGS. 2A-2B are schematic diagrams illustrating sensing circuitry in accordance with a number of embodiments of the present disclosure.

FIG. 2A is a schematic diagram illustrating sensing circuitry the can be used in association with smallest value element determination in accordance with a number of embodiments of the present disclosure. Although the examples provided herein are associated with determining a smallest value element, embodiments are not so limited. For instance, embodiments can include determining a largest value element. FIG. 2A shows a number of sense amplifiers 206 coupled to respective pairs of complementary sense lines 205-1 and 205-2, and a corresponding number of compute components 231 coupled to the sense amplifiers 206 via pass gates 207-1 and 207-2. The sense amplifiers 206 and compute components 231 shown in FIG. 2A can correspond to sensing circuitry 150 shown in FIG. 1, for example. The sensing circuitry shown in FIG. 2A includes logical operation selection logic 213, which can be operated as described further below.

Although not shown in FIG. 2A, the pairs of complementary sense lines 205-1 and 205-2 are coupled to memory cells (e.g., each pair of complementary sense lines can correspond to a "column" of an array of memory cells). The memory cells can be, for example, 1T1C DRAM cells each comprising a storage element (e.g., capacitor) and an access device (e.g., transistor). The cells of the memory array can be arranged in rows coupled by word lines and columns coupled by pairs of complementary data lines DIGIT(n−1)/ DIGIT(n−1)_, DIGIT(n)/DIGIT(n)_, DIGIT(n+1)/DIGIT (n+1)_. The individual data lines corresponding to each pair of complementary data lines can also be referred to as data lines 205-1 (D) and 205-2 (D_) respectively. Although only three pairs of complementary data lines (e.g., three columns) are shown in FIG. 2A, embodiments of the present disclosure are not so limited, and an array of memory cells can include additional columns of memory cells and/or data lines (e.g., 4,096, 8,192, 16,384, etc.).

Figure 6:
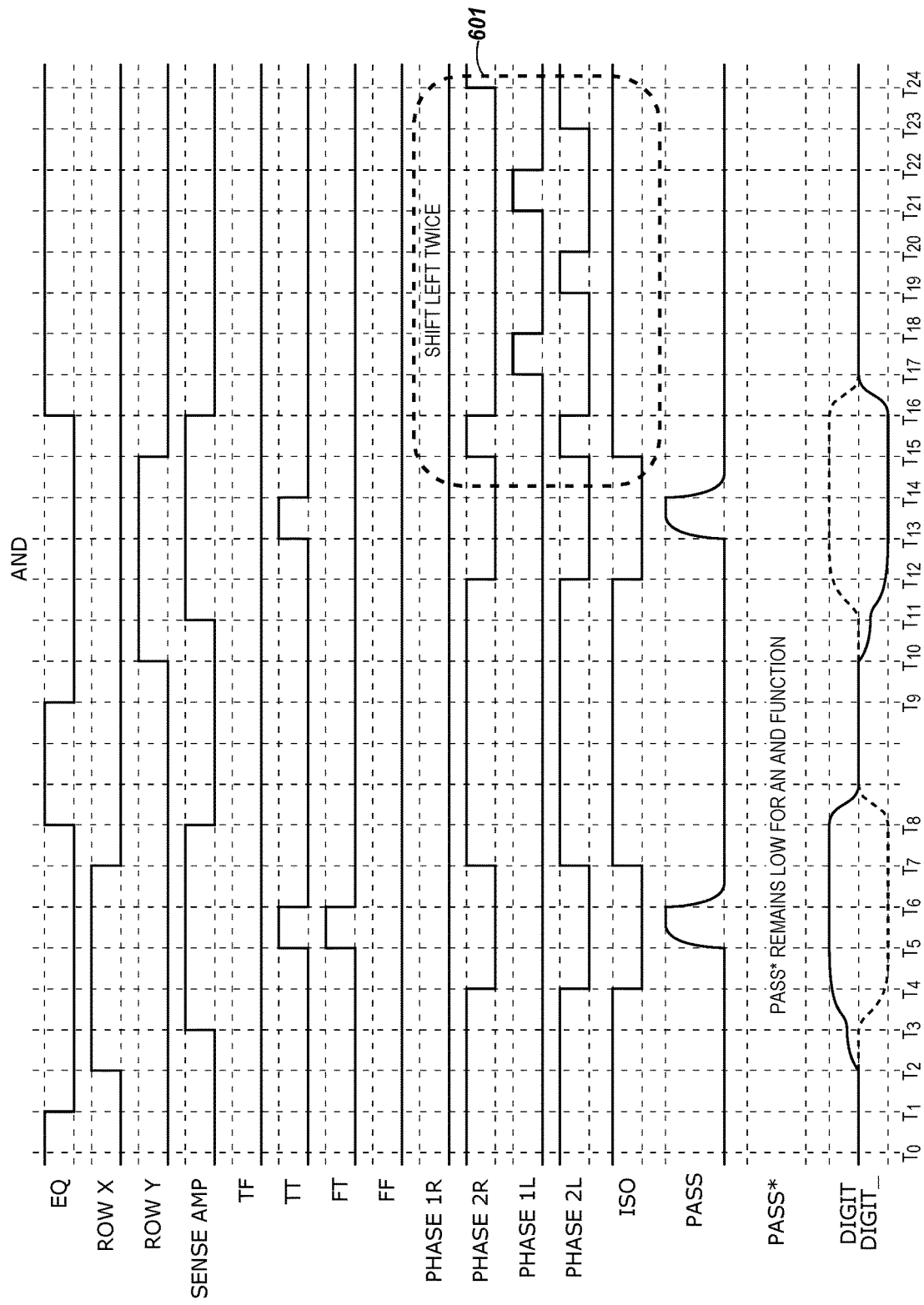
FIG. 6 illustrates a timing diagram associated with performing a logical AND operation and a shifting operation using the sensing circuitry in accordance with a number of embodiments of the present disclosure.

According to the embodiment illustrated in FIG. 2A, the compute components 231 can comprise respective stages (e.g., shift cells) of a loadable shift register configured to shift data values (e.g., left and right) as described further herein with respect to FIG. 6. For example, as illustrated in FIG. 2A, each compute component 231 (e.g., stage) of the shift register comprises a pair of right-shift transistors 281 and 286, a pair of left-shift transistors 289 and 290, and a pair of inverters 287 and 288. The signals PHASE 1R, PHASE 2R, PHASE 1L, and PHASE 2L can be applied to respective control lines 282, 283, 291 and 292 to enable/disable feedback on the latches of the corresponding compute components 231 in association with performing logical operations and/or shifting data in accordance with embodiments described herein. An example of shifting data (e.g., from a particular compute component 231 to an adjacent compute component 231) is described further below with respect to FIG. 6.

The logical operation selection logic 213 includes logic to control the pass gates 207-1 and 207-2 and swap gates 242. In this example, the logical operation selection logic 213 includes four logic selection transistors: logic selection transistor 262 coupled between the gates of the swap transistors 242 and a TF signal control line, logic selection transistor 252 coupled between the gates of the pass gates 207-1 and 207-2 and a TT signal control line, logic selection transistor 254 coupled between the gates of the pass gates 207-1 and 207-2 and a FT signal control line, and logic selection transistor 264 coupled between the gates of the swap transistors 242 and a FF signal control line. Gates of logic selection transistors 262 and 252 are coupled to the true sense line through isolation transistor 250-1 (having a gate coupled to an ISO signal control line). Gates of logic selection transistors 264 and 254 are coupled to the complementary sense line through isolation transistor 250-2 (also having a gate coupled to an ISO signal control line). As described further below, the logical operation selection logic 213 can be operated (e.g., via control signals ISO, TT, TF, FT, and FF) to perform a selected logical operation. For instance, FIG. 6 illustrates a timing diagram associated with performing a logical AND operation using the sensing circuitry shown in FIG. 2A.

Data values present on the pair of complementary sense lines 205-1 and 205-2 can be loaded into the compute component 231 via the pass gates 207-1 and 207-2. When the pass gates 207-1 and 207-2 are OPEN (e.g., in a conducting state), data values on the pair of complementary sense lines 205-1 and 205-2 are passed to the compute component 231 and thereby loaded into the loadable shift register. The data values on the pairs of complementary sense lines 205-1 and 205-2 can be the data values stored in the sense amplifiers 206 when the sense amplifiers are enabled (e.g., fired). The logical operation selection logic signal, Pass, can be activated to OPEN (e.g., turn on) the pass gates 207-1 and 207-2.

The ISO, TF, TT, FT, and FF control signals can operate to select a logical operation to perform based on a data value ("B") in the sense amplifier 206 and a data value ("A") in the compute component 231 (e.g., as used herein, the data value stored in a latch of a sense amplifier is referred to as a "B" data value, and the data value stored in a latch of a compute component is referred to as an "A" data value). In particular, the ISO, TF, TT, FT, and FF control signals are configured to select the logical operation (e.g., function) to perform independent from the data value present on the pair of complementary sense lines 205-1 and 205-2 (although the result of the performed logical operation can be dependent on the data value present on the pair of complementary sense lines 205-1 and 205-2. For example, the ISO, TF, TT, FT, and FF control signals select the logical operation to perform directly since the data value present on the pair of complementary sense lines 205-1 and 205-2 is not passed through logic to operate the gates of the pass gates 207-1 and 207-2.

The swap transistors 242 are configured to couple the true sense line on one side of the pass gates 207-1 and 207-2 to the complement sense line on the other side of the pass gates 207-1 and 207-2. When pass gates 207-1 and 207-2 are CLOSED (e.g., not conducting) and swap gates 242 are OPEN (e.g., conducting), the true and complement data values are swapped in communication to the compute component 231 such that the true data value from the sense amplifier 206 is loaded into the compute component 231 as the complement data value, and the complement data value from the sense amplifier 206 is loaded into the compute component 231 as the true data value. The gates of swap transistors 242 are coupled to an inverted Pass (e.g., "Pass*") signal control line.

As an example, the logical operation selection logic signal Pass can be activated (e.g., high) to OPEN (e.g., turn on) the pass gates 207-1 and 207-2 when the ISO control signal line is activated and either the TT control signal is activated (e.g., high) with the data value on the true sense line being "1" or the FT control signal is activated (e.g., high) with the data value on the complement sense line being "1."

The data value on the true sense line being a "1" OPENs logic selection transistors 252 and 262. The data value on the complementary sense line being a "1" OPENs logic selection transistors 254 and 264. If the ISO control signal or either the respective TT/FT control signal or the data value on the corresponding sense line (e.g., sense line to which the gate of the particular logic selection transistor is coupled) is not high, then the pass gates 207-1 and 207-2 will not be OPENed by a particular logic selection transistor.

The logical operation selection logic signal Pass* can be activated (e.g., high) to OPEN (e.g., turn on) the swap transistors 242 when the ISO control signal line is activated and either the TF control signal is activated (e.g., high) with data value on the true sense line being "1," or the FF control signal is activated (e.g., high) with the data value on the complement sense line being "1." If either the respective control signal or the data value on the corresponding sense line (e.g., sense line to which the gate of the particular logic selection transistor is coupled) is not high, then the swap transistors 242 will not be OPENed responsive to enabling a particular logic selection transistor. FIG. 2C provides a logic table indicating various logical operations implementable via operation of the sensing circuitry shown in FIG. 2A.

Although not shown in FIG. 2A, each column of memory cells can be coupled to a column decode line that can be activated to transfer, via a local I/O line, a data value from a corresponding sense amplifier 206 and/or compute component 231 to a control component external to the array such as an external processing resource (e.g., host processor and/or other functional unit circuitry). The column decode line can be a decode line such as column decode line 310 shown in FIG. 3 and can be coupled to a column decoder such as column decoder 152 shown in FIG. 1. However, as described herein, in a number of embodiments, data need not be transferred via such I/O lines (e.g., I/O line 334 shown in FIG. 3) to perform logical operations in accordance with embodiments of the present disclosure.

As noted above, the compute components 231 can comprise a loadable shift register. In this example, each compute component 231 is coupled to a corresponding pair of complementary data lines 205-1/205-2, with a node ST2 being coupled to the particular data line (e.g., DIGIT(n)) communicating a "true" data value and with node SF2 being coupled to the corresponding complementary data line (e.g., DIGIT(n)_) communicating the complementary data value (e.g., "false" data value).

In this example, the compute components 231 comprise a first right-shift transistor 281 having a gate coupled to a first right-shift control line 282 (e.g., PHASE 1R), and a second right-shift transistor 286 having a gate coupled to a second right-shift control line 283 (e.g., PHASE 2R). Node ST2 of the particular control component is coupled to an input of a first inverter 287, whose output (e.g., node SF1) is coupled to a first source/drain region of transistor 286. The second source/drain region of transistor 286 is coupled to the input (e.g., node SF2) of a second inverter 288. The output (e.g., node ST1) of inverter 288 is coupled to a first source/drain region of transistor 281, and a second source/drain region of transistor 281 the compute components 231 is coupled to an input (e.g., node ST2) of inverter 287 of an adjacent compute component 231. The loadable shift register shown in FIG. 2A includes a first left-shift transistor 289 coupled between node SF2 of a particular compute component and node SF1 of an adjacent compute component 231. The loadable shift register shown in FIG. 2A also includes a second left-shift transistor 290 of a particular compute component 231 having a first source/drain region coupled to node ST2 and a second source/drain region coupled to node ST1. The gate of the first left-shift transistor 289 is coupled to a first left-shift control line 291 (e.g., PHASE 1L), and the gate of the second left-shift transistor 290 is coupled to a second left-shift control line 292 (e.g., PHASE 2L).

In operation, a data value on a pair of complementary data lines (e.g., 205-1/205-2) can be loaded into a corresponding compute component 231 (e.g., by operating logical operation selection logic as described above). As an example, a data value can be loaded into a compute component 231 via overwriting of the data value currently stored in the compute component 231 with the data value stored in the corresponding sense amplifier 206. Alternatively, a data value may be loaded into a compute component by deactivating the control lines 282, 283, 291, and 292.

Once a data value is loaded into a compute component 231, the "true" data value is separated from the complement data value by the first inverter 287. Shifting data to the right (e.g., to an adjacent compute component 231) can include alternating operation of the first right-shift transistor 281 and the second right-shift transistor 286, for example, via the PHASE 1R and PHASE 2R control signals being periodic signals that go high out of phase from one another (e.g., non-overlapping alternating square waves 180 out of phase). The transistors 290 and 286 can be turned on to latch the shifted data value (e.g., by enabling feedback).

As described further in association with FIG. 6, an example of shifting data left via the compute components 231 shown in FIG. 2A can include operating control signals 291 and 292 to move a data value one control component to the left through transistors 289 and 290. Data from node ST2 is inverted through inverter 287 to node SF 1. Activation of control signal 291 causes the data from node SF1 to move left through transistor 289 to node SF2 of a left-adjacent compute component 231. Data from node SF2 is inverted through inverter 288 to node ST1. Subsequent activation of control signal 292 causes the data from node ST1 to move through transistor 290 left to node ST2, which completes a left shift by one compute component 231. Data can be "bubbled" to the left by repeating the left shift sequence multiple times. Data values can be latched (and prevented from being further shifted) by maintaining the control signal 292 activated.

Figure 2B:
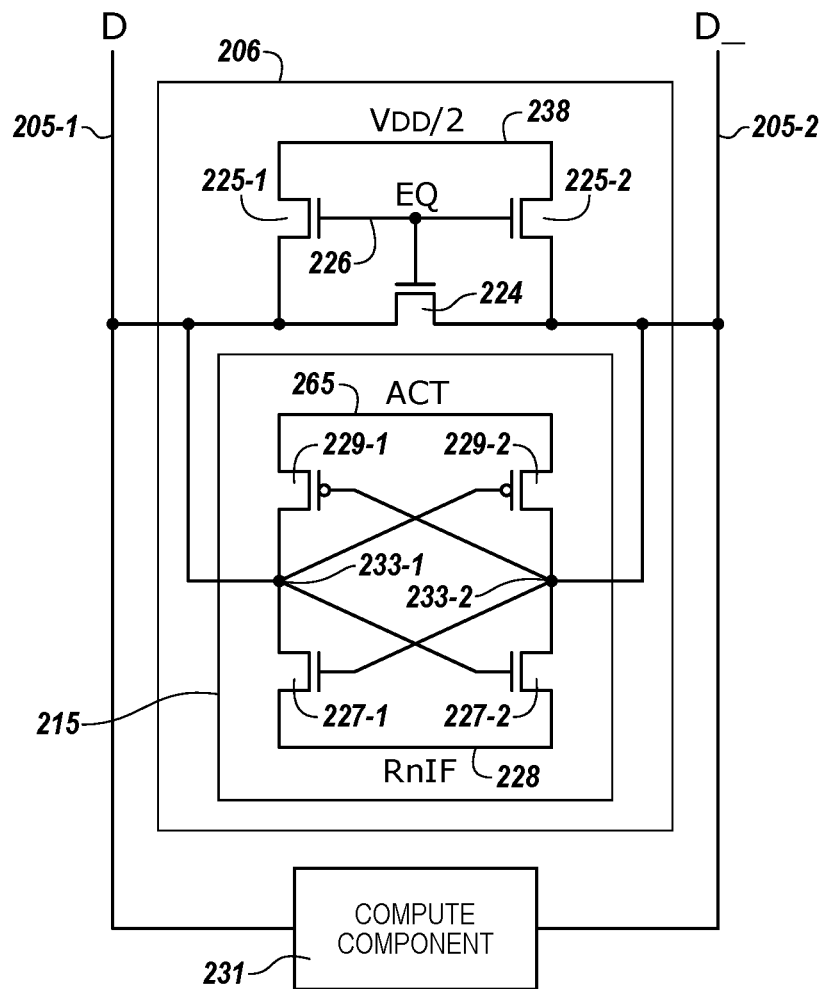
Figure 2C:
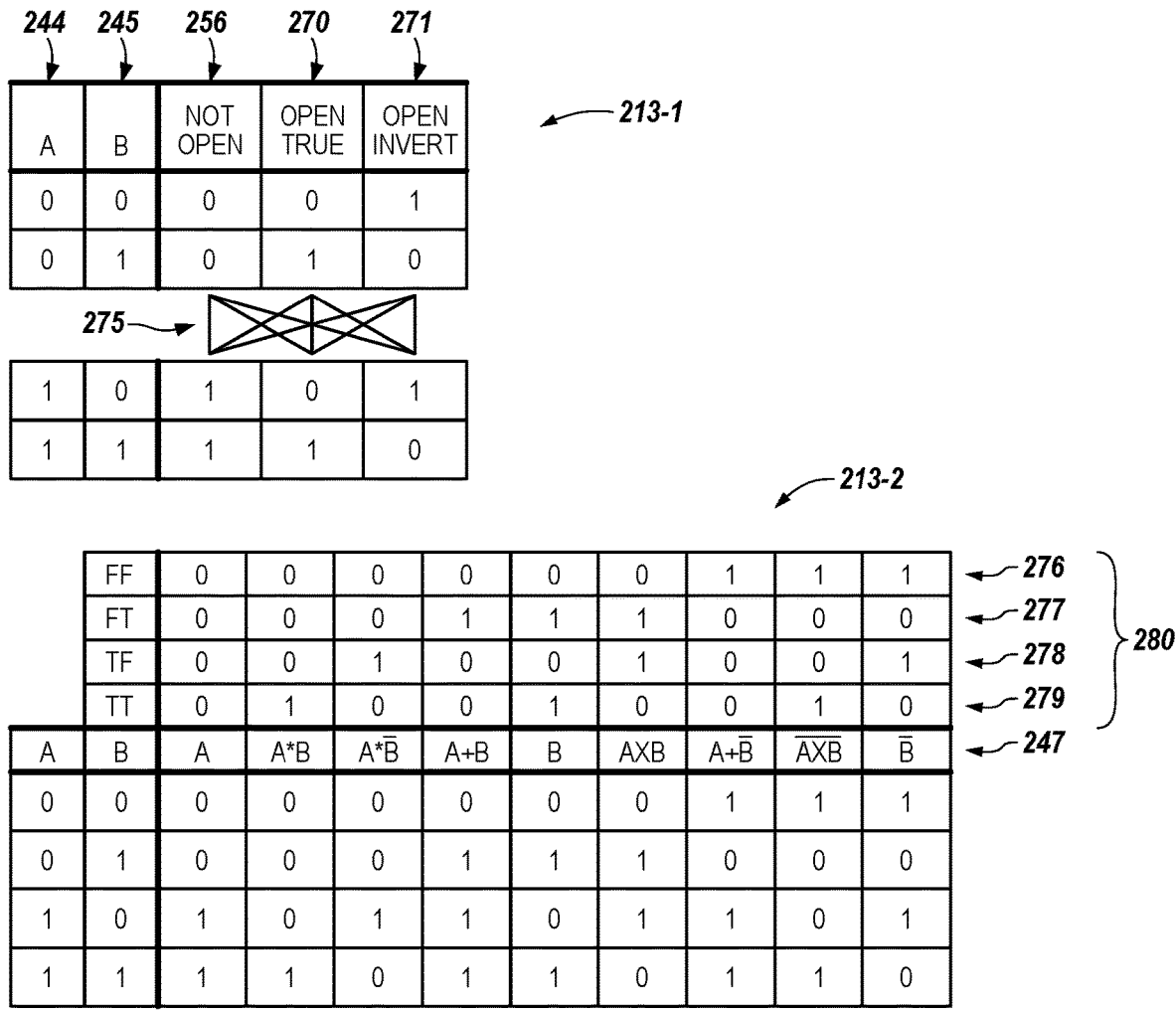
FIG. 2C is a logic table illustrating results of logical operations that can be performed using sensing circuitry in accordance with a number of embodiments of the present disclosure.

FIG. 2B illustrates a schematic diagram of a portion of sensing circuitry in accordance with a number of embodiments of the present disclosure. According to various embodiments, sense amplifier 206 can comprise a cross coupled latch 215. However, embodiments of the sense amplifier 206 are not limited to a cross coupled latch. As an example, the sense amplifier 206 in FIG. 2B can be current-mode sense amplifier and/or single-ended sense amplifier (e.g., sense amplifier coupled to one data line). Also, embodiments of the present disclosure are not limited to a folded data line architecture.

In a number of embodiments, a sense amplifier (e.g., 206) and a corresponding compute component (e.g., 231) can comprise a number of transistors formed on a same pitch as the data lines (e.g., 205-1/205-2) of an array (e.g., array 330 shown in FIG. 3) to which they are coupled. Sense amplifier 206 comprises a latch 215 including four transistors coupled to a pair of complementary data lines D 205-1 and D_ 205-2. The gates of a pair of transistors, such as n-channel transistors (e.g., NMOS transistors) 227-1 and 227-2 are cross coupled with the gates of another pair of transistors, such as p-channel transistors (e.g., PMOS transistors) 229-1 and 229-2. As described further herein, the latch 215 comprising transistors 227-1, 227-2, 229-1, and 229-2 can be referred to as a primary latch. However, embodiments are not limited to this example.

The voltages or currents on the respective data lines D and D_ can be provided to the respective latch inputs 233-1 and 233-2 of the cross coupled latch 215 (e.g., the input of the primary latch). In this example, the latch input 233-1 is coupled to a first source/drain region of transistors 227-1 and 229-1 as well as to the gates of transistors 227-2 and 229-2. Similarly, the latch input 233-2 can be coupled to a first source/drain region of transistors 227-2 and 229-2 as well as to the gates of transistors 227-1 and 229-1. In this example, a compute component 231 is coupled to latch inputs 233-1 and 233-2 of the cross coupled latch 215 as shown; however, embodiments are not limited to the example shown in FIG. 2B.

In this example, a second source/drain region of transistor 227-1 and 227-2 is commonly coupled to an RnIF signal 228. A second source/drain region of transistors 229-1 and 229-2 is commonly coupled to an ACT signal 265. The ACT signal 265 can be a supply voltage (e.g., $V_{DD}$) and the RnIF signal can be a reference voltage (e.g., ground). Activating signals 228 and 265 enables the cross coupled latch 215.

The enabled cross coupled latch 215 operates to amplify a differential voltage between latch input 233-1 (e.g., first common node) and latch input 233-2 (e.g., second common node) such that latch input 233-1 is driven to one of the ACT signal voltage and the RnIF signal voltage (e.g., to one of $V_{DD}$ and ground), and latch input 233-2 is driven to the other of the ACT signal voltage and the RnIF signal voltage.

The sense amplifier 206 can also include circuitry configured to equilibrate the data lines D and D_ (e.g., in association with preparing the sense amplifier for a sensing operation). In this example, the equilibration circuitry comprises a transistor 224 having a first source/drain region coupled to a first source/drain region of transistor 225-1 and data line D 205-1. A second source/drain region of transistor 224 can be coupled to a first source/drain region of transistor 225-2 and data line D_ 205-2. A gate of transistor 224 can be coupled to gates of transistors 225-1 and 225-2.

The second source drain regions of transistors 225-1 and 225-2 are coupled to an equilibration voltage 238 (e.g., $V_{DD}/2$), which can be equal to $V_{DD}/2$, where $V_{DD}$ is a supply voltage associated with the array. The gates of transistors 224, 225-1, and 225-2 can be coupled to control signal 226 (EQ). As such, activating EQ enables the transistors 224, 225-1, and 225-2, which effectively shorts data line D to data line D_ such that the data lines D and D_ are equilibrated to equilibration voltage $V_{DD}/2$. According to a number of embodiments of the present disclosure, a number of logical operations can be performed using the sense amplifier 206 and compute component 231, and the result can be stored in the sense amplifier and/or compute component.

FIG. 2C is a logic table illustrating results of logical operations that can be performed using sensing circuitry in accordance with a number of embodiments of the present disclosure. The four logic selection control signals (e.g., TF, TT, FT, and FF) can be controlled to select one of plural logical operations to perform using an "A" data value and a "B" data value as inputs. As an example, the "A" data value can be a data value stored in a first memory cell and the "B" data value can be a data value stored in a second memory cell. Performing the selected operation can involve transferring the "A" data value to a compute component 231 prior to firing the sense amplifier 206. Table 213-1 illustrated in FIG. 2C shows the starting data value stored in the compute component 231 in FIG. 2A shown in column A at 244, and the starting data value stored in the sense amplifier 206 shown in column B at 245. The other 3 column headings in Logic Table 213-1 refer to the state of the pass gates 207-1 and 207-2, and the swap transistors 242, which can respectively be controlled to be OPEN (e.g., conducting/on) or CLOSED (e.g., not conducting/off) depending on the state of the four logic selection control signals (e.g., TF, TT, FT, and FF), in conjunction with a particular data value present on the pair of complementary sense lines 205-1 and 205-2 when the ISO control signal is asserted. The "NOT OPEN" column corresponds to the pass gates 207-1 and 207-2 and the swap transistors 242 both being in a non-conducting condition, the "OPEN TRUE" corresponds to the pass gates 207-1 and 207-2 being in a conducting condition, and the "OPEN INVERT" corresponds to the swap transistors 242 being in a conducting condition. The configuration corresponding to the pass gates 207-1 and 207-2 and the swap transistors 242 both being in a conducting condition is not reflected in Logic Table 213-1 since this results in the sense lines being shorted together.

The logic tables illustrated in FIG. 2C reflect a result initially stored in the compute component 231 in FIG. 2A. Therefore, when the pass gates 207-1 and 207-2 are controlled to be CLOSED (e.g., not conducting), the result initially stored in the compute component 231 is the same as the starting data value in the compute component 231. However, since the sense sensing circuitry 250 is configured such that the sense amplifier 206 can overpower the compute component 231 as shown in the "NOT OPEN" column 256 of Table 213-1, the result initially stored in the compute component 231 is the same as the starting data value in the sense amplifier 206 when the pass gates 207-1 and 207-2 are controlled to be OPEN (e.g., conducting) as shown in the "OPEN TRUE" column 270 of Table 213-1. The compute component 231 can be inverted as shown in the "OPEN INVERT" column 271 when the swap transistors 242 are in a conducting condition.

Via selective control of the state of the pass gates 207-1 and 207-2 and the swap transistors 242, each of the three columns of the upper portion of Logic Table 213-1 can be combined with each of the three columns of the lower portion of Logic Table 213-1 to provide 3×3=9 different result combinations, corresponding to nine different logical operations, as indicated by the various connecting paths shown at 275. The nine different selectable logical operations that can be performed by the sensing circuitry 250 are summarized in Logic Table 213-2 illustrated in FIG. 2C.

The columns of Logic Table 213-2 illustrated in FIG. 2C show a heading 280 that includes the states of logic selection control signals (e.g., FF, FT, TF, TT). For example, the state of a first logic selection control signal (e.g., FF) is provided in row 276, the state of a second logic selection control signal (e.g., FT) is provided in row 277, the state of a third logic selection control signal (e.g., TF) is provided in row 278, and the state of a fourth logic selection control signal (e.g., TT) is provided in row 279. The particular logical operation corresponding to the results is summarized in row 247.

For example, the results for the values of FF, FT, TF, and TT of "0000" are summarized as "A" since the result (initially stored in the compute component after the sense amplifier fires) is the same as the starting value in the compute component. Other columns of results are similarly annotated in row 247, where "A*B" intends A AND B, "A+B" intends A OR B, and "AXB" intends A XOR B. By convention, a bar over a data value or a logical operation indicates an inverted value of the quantity shown under the bar.

FIG. 3 is a schematic diagram of a portion of a memory array in accordance with a number of embodiments of the present disclosure. The array 330 includes memory cells (referred to generally as memory cells 303, and more specifically as 303-0 to 303-J) coupled to rows of access lines 304-0, 304-1, 304-2, 304-3, 304-4, 304-5, 304-6, . . . , 304-R (referred to generally as access lines 304) and columns of sense lines 305-0, 305-1, 305-2, 305-3, 305-4, 305-5, 305-6, 305-7, . . . , 305-S (referred to generally as sense lines 305). Memory array 330 is not limited to a particular number of access lines and/or sense lines, and use of the terms "rows" and "columns" does not intend a particular physical structure and/or orientation of the access lines and/or sense lines. Although not pictured, each column of memory cells can be associated with a corresponding pair of complementary sense lines (e.g., complementary sense lines 205-1 and 205-2 in FIG. 2A).

Each column of memory cells can be coupled to sensing circuitry (e.g., sensing circuitry 150 shown in FIG. 1). In this example, the sensing circuitry comprises a number of sense amplifiers 306-0, 306-1, 306-2, 306-3, 306-4, 306-5, 306-6, 306-7, . . . , 306-U (referred to generally as sense amplifiers 306) coupled to the respective sense lines 305-0, 305-1, 305-2, 305-3, 305-4, 305-5, 305-6, 305-7, . . . , 305-S. The sense amplifiers 306 are coupled to input/output (I/O) line 334 (e.g., a local I/O line) via access devices (e.g., transistors) 308-0, 308-1, 308-2, 308-3, 308-4, 308-5, 308-6, 308-7, . . . , 308-V. In this example, the sensing circuitry also comprises a number of compute components 331-0, 331-1, 331-2, 331-3, 331-4, 331-5, 331-6, 331-7, . . . , 331-X corresponding to respective sense amplifiers 306 and coupled to the respective sense lines 305. Column decode lines 310-1 to 310-W are coupled to the gates of transistors 308-1 to 308-V, respectively, and can be selectively activated to transfer data sensed by respective sense amplifiers 306-0 to 306-U and/or stored in respective compute components 331-0 to 331-X to a secondary sense amplifier 312. In a number of embodiments, the compute components 331 can be formed on pitch with the sense lines corresponding to columns of the array and/or with the corresponding sense amplifiers 306.

In a number of embodiments, the sensing circuitry (e.g., compute components 331 and sense amplifiers 306) is configured to perform operations to generate a mask indicating a smallest value element from among a plurality of elements stored in array 330. As an example, a plurality of elements each comprising four data units (e.g., 4-bit elements) can be stored in a plurality of memory cells. A first 4-bit element of the plurality of elements can be stored in a first group of memory cells coupled to an access line (e.g., 304-0) and to a number of sense lines (e.g., 305-0, 305-1, 305-2, 305-3), a second element can be stored in a second group of memory cells coupled to the access line (e.g., 304-0) and to a different number of sense lines (e.g., sense lines 305-4, 305-5, 305-6, 305-7), a third element can be stored in a third group of memory cells coupled to the access line (e.g., 304-0) and to a different number of sense lines (e.g., sense lines 305-8, 305-9, 305-10, 305-11), a fourth element can be stored in a fourth group of memory cells coupled to the access line (e.g., 304-0) and to a different number of sense lines (e.g., sense lines 305-12, 305-13, 305-14, 305-15), a fifth element can be stored in a fifth group of memory cells coupled to the access line (e.g., 304-0) and to a different number of sense lines (e.g., sense lines 305-16, 305-17, 305-18, 305-19), a sixth element can be stored in a sixth group of memory cells coupled to the access line (e.g., 304-0) and to a different number of sense lines (e.g., sense lines 305-20, 305-21, 305-22, 305-23), a seventh element can be stored in a seventh group of memory cells coupled to the access line (e.g., 304-0) and to a different number of sense lines (e.g., sense lines 305-24, 305-25, 305-26, 305-27), an eighth element can be stored in an eighth group of memory cells coupled to the access line (e.g., 304-0) and to a different number of sense lines (e.g., sense lines 305-28, 305-29, 305-30, 305-31). Sense lines 305-8 to 305-31 are not specifically illustrated in FIG. 3 but are represented by 305-S. As such, the plurality of elements are stored in a same row of memory cells. The plurality of elements can be referred to as an elements vector. As described further herein, a number of additional vectors can be stored in rows of array 330 and can be operated on (e.g., using sense amplifiers 306 and compute components 331) to create a smallest value element mask.

An example of a creating a smallest value element mask is described below in association with FIG. 4, which illustrates tables showing the states of memory cells of an array (e.g., 330) at a number of particular phases associated with creating a smallest value element mask in accordance with a number of embodiments described herein. In a number of examples, creating a smallest value element mask includes performing a number of AND operations, OR operations, SHIFT operations, INVERT operations, and BlockOR operations. Creating a smallest value element mask can include performing the AND operations, OR operations, SHIFT operations, and INVERT operations without transferring data via an input/output (I/O) line. The number of AND operations, OR operations, INVERT operations, and SHIFT operations can be performed using sensing circuitry on pitch with columns of complementary sense lines.

The reference numbers of the rows of the table shown in FIG. 4 correspond to respective reference numbers of the pseudo code described below (e.g., row 451-1 corresponds to reference number 1 of the pseudo code and rows 451-2 to 451-6 correspond to respective reference numbers 2 to 6 of the pseudocode). Each row of the table indicates the values of a number of vectors (e.g., bit vectors 431 (COMP_COMP), 433 (INVERTED ELEMENTS), 435 (BOUNDARY), 437 (ELEMENT MASK), 439 (LSB), 441 (TMP), 443 (RESULT), and 445 (ELEMENTS)) at a particular phase of creating a smallest value element mask as can be stored in rows and/or columns of memory cells in the array (e.g., array 330 in FIG. 3).

The example described in association with FIG. 4 includes performing a number of operations, using sensing circuitry such as that shown in FIG. 2A, to determine a smallest value element from a plurality of elements stored in memory cells coupled to a particular access line of an array, and creating a mask that identifies the smallest value element(s) (e.g., those elements of the plurality of elements having a smallest value).

In the example below, the plurality of elements comprise eight elements that are each four bits wide. The eight elements are represented by the 32 bit wide ELEMENTS bit-vector 445, which, in the example shown in FIG. 4, are represented in binary notation as [1010 1011 1100 1101 1110 1111 0001 0010] (e.g., hexadecimal [A,B,C,D,E,F,1,2], with the commas used between different elements to denote separate elements). For ease of reference, the various bit-vectors in FIG. 4 are shown in hexadecimal notation (e.g., as indicated by the leading "0x"). For instance, vector 445 is shown as "0xABCDEF12". In the example described in FIG. 4, the values of the elements correspond to base ten (10) numerical values. For instance, a first element of vector 445 (e.g., "0xA") corresponds to a base ten value of 10 (e.g., binary 1010), the second element of vector 445 (e.g., "0xB") corresponds to a base ten value of 11 (e.g., binary 1011), etc. Although hexadecimal notation is used in FIG. 4, the bit-vectors are stored as binary data patterns in the array.

In a number of embodiments, the bit-vectors 431, 433, 435, 437, 439, 441, and 443 comprise a same number of bits as the ELEMENTS vector 445 (e.g., 32 bits in the example shown in FIG. 4). In a number of examples, the bit-vectors 433, 435, 437, 439, 441, and 443 can be stored in the array such that the respective bit positions are aligned column-wise. For instance a first bit of each of the vectors 433, 435, 437, 439, 441, and 443 can be stored in a memory cell coupled to a same column, a second bit of each of the vectors 433, 435, 437, 439, 441, and 443 can be stored in a memory cell coupled to a same column, etc., which can provide benefits such as facilitating parallel processing as described further herein. However, embodiments are not limited to the example described in FIG. 4. For instance, the ELEMENTS vector 445 can comprise greater or fewer than eight elements, and the respective elements can comprise greater or fewer than four bits.

The expected result of the example described in FIG. 4 is the generation of a mask indicating which of those elements of bit-vector 445 [0xABCDEF12] have a smallest value. In this example, the seventh element (e.g., [0x1]), which has a decimal value of "1" is the smallest value element, so the expected result is a mask indicating that the seventh element of bit vector 445 is the smallest value element. In the example described in FIG. 4, the RESULT bit-vector 443 can be updated as operations are performed such that it can serve as the generated mask indicating the smallest value element. In this example, the smallest value element is indicated via the bit positions within the RESULT bit-vector 443 and corresponding to the smallest value element within ELEMENT bit-vector 445 being a logic "1" (e.g., and via the bit positions within vector 443 not corresponding to the smallest value element being logic "0"). For instance, in this example the expected state of the RESULT bit-vector 443 is [0x000000F0] (e.g., binary [0000 0000 0000 0000 0000 0000 1111 0000]. As shown in row 451-6 of the table shown in FIG. 4, the expected result of [0x000000F0] for vector 443 is obtained subsequent to performing operations in accordance with embodiments described herein. In the examples described herein, the left most bit of a bit-vector is considered the most significant bit and the right most bit of the bit-vector is considered the least significant bit; however, embodiments are not so limited.

The below pseudocode represents instructions to generate a smallest value element mask in memory in accordance with a number of embodiments of the present disclosure. The example pseudocode is referenced using reference numbers 1-6, which correspond to the reference numbers of the rows shown in the table of FIG. 4. For instance, reference number 1 of the pseudocode (e.g., "Load ELEMENTS bit-vector, RESULT bit-vector") corresponds to row 451-1 of the table, reference number 2 of the pseudocode (e.g., "Invert ELEMENTS bit-vector into INVERTED ELEMENTS bit-vector") corresponds to row 451-2 of the table, . . . , reference number 6 of the pseudocode (e.g., "Copy ELEMENT MASK bit-vector to RESULT bit-vector and Return RESULT bit-vector") corresponds to row 451-6 of the table.

with initializing the ELEMENTS bit-vector 445 and the RESULT bit-vector 443. Initializing bit-vector 445 can include loading data corresponding to a plurality of elements into a number of memory cells configured to store the bit-vector 445 (e.g., a number of adjacent memory cells coupled to a particular access line). As shown in row 451-1, in this example, the ELEMENTS bit-vector is [0xABCDEF12]. Initializing bit-vector 443 can include designating a number of memory cells (e.g., 32 cells in this example) coupled to an access line of the array to store the bit-vector 443. In this example, initializing bit-vector 443 includes clearing the bit-vector such that the constituent bits are all logic "0". For instance, as shown in row 451-1, the initialized RESULT bit-vector 443 is [0x00000000].

Reference number 2 of the above pseudocode (e.g., "Invert ELEMENTS bit-vector into INVERTED ELEMENTS bit-vector") is associated with inverting the ELEMENTS bit-vector 445 and storing the resultant bit-vector in a number of memory cells as INVERTED ELEMENTS bit-vector 433. Inverting the elements bit-vector 445 can include performing an invert operation on the bit-vector 445. For instance, the ELEMENTS bit-vector 445 can be loaded from the array into the corresponding sensing components (e.g., 331), which can be operated to perform the invert operation (e.g., to invert the constituent bits of bit-vector 445), with the result residing in the sensing components as COMP_COMP bit-vector 431 (e.g., as shown in row 451-1). As indicated in row 451-1, the inverted bit-vector can then be copied from the sensing components to the cells used to store INVERTED ELEMENTS bit-vector 433, which is [0x543210ED] (e.g., the inverted form of ELEMENTS bit-vector 445, which is [0xABCDEF12]). As described further herein, a number of subsequent operations (e.g., logical operations) can be performed using the bit-vector 433 as an input in association with determining the smallest value element in accordance with a number of embodiments. As an example, the bit-vector 433 can provide an indication

---

1. Load ELEMENTS bit-vector, RESULT bit-vector;
2. Invert ELEMENTS bit-vector into INVERTED ELEMENTS bit-vector;
3. Generate BOUNDARY bit-vector;
4. Create ELEMENT MASK bit-vector with all true bits as if all elements are smallest value elements;
5. Start iteration of operations for given element width;
    a.    Load BOUNDARY bit-vector into COMP_COMP;
    b.    Check if first bits for elements needs to skip;
        i.    AND BOUNDARY bit-vector and ELEMENT MASK bit-vector;
        ii.    Shift COMP_COMP right by current loop distance;
    c.    AND COMP_COMP and INVERTED ELEMENTS bit-vector;
    d.    Store as RESULT bit-vector;
    e.    if BlockOR is true;
        i.    Create a least significant bit pattern and store as LSB bit-vector;
        ii.    Compare RESULT bit-vector and LSB bit-vector and store as TMP bit-vector;
        iii.    Update ELEMENT MASK bit-vector with TMP bit-vector;
6. Copy ELEMENT MASK bit-vector to RESULT bit-vector and Return RESULT bit-vector;

---

In the example illustrated in FIG. 4, a bit-vector illustrated in bold font indicates a change in the bit-vector has occurred since a previous phase. For instance, bit-vector 443 is shown in bold in row 451-5.2.d of the table shown in FIG. 4 to indicate a change from [0x00000088] (as shown in row 451-5.2.c) to [0x00000044] (as shown in row 451-5.2.d).

Reference number 1 of the above pseudocode (e.g., "Load ELEMENTS bit-vector, RESULT bit-vector") is associated of those elements of bit-vector 445 having a largest value, since inverting the bits of an element having a smallest value will result in a bit-vector having a largest value. For instance, assuming only positive integer values, an element having a decimal value of "0" (e.g., binary [0000] or hexadecimal [0x0]) will have a decimal value of "15" when inverted (e.g., binary bit-vector [1111] or hexadecimal [0xF]).

Reference number 3 of the above pseudocode (e.g., "Generate BOUNDARY bit-vector") is associated with generating a bit-vector that provides an indication of the boundaries of the respective elements within an elements bit-vector (e.g., ELEMENTS bit-vector 445). In this example, the bit pattern corresponding to BOUNDARY bit-vector 435 comprises a logic "1" at those bit positions corresponding to a most significant bit of the respective elements and a logic "0" at the remaining bit positions. In this example, each of the eight elements comprise four bits. As such, the BOUNDARY bit-vector 435 is [0x88888888] (e.g., binary [1000 1000 1000 1000 1000 1000 1000 1000]. An example of generating bit-vector 435 can include storing a logic "1" in the sensing components corresponding to bit-vector 431 (e.g., COMP_COMP 431 to [0xFFFFFFFF]) and shifting right one bit position (e.g., resulting in bit-vector [0x7FFFFFFF]. An invert operation can be performed on the right-shifted bit-vector (e.g., resulting in [0x80000000]) and stored in the array for later use. The inverted bit-vector (e.g., [0x80000000]) can be shifted right by a quantity of bit positions equal to an element width (e.g., four in this example) resulting in bit-vector [0x08000000]. The resulting bit-vector (e.g., [0x08000000]) can be ORed with the stored bit-vector (e.g., [0x80000000]), resulting in bit-vector [0x88000000]. The shifting and ORing operations can be repeated to result in a bit-vector that includes a "1" at the MSB position for each element (e.g., bit-vector [0x88888888]) residing in the sensing components (e.g., as shown in row 451-3 with COMP_COMP 431 storing [0x88888888]). As shown in row 451-3, the resulting bit-vector (e.g., [0X88888888]) can be copied to the memory cells storing BOUNDARY bit-vector 435. As described further herein, a number of subsequent operations (e.g., logical operations) can be performed using the bit-vector 435 as an input in association with determining the smallest value element in accordance with a number of embodiments.

As used herein, performing a logical operation on a first and second bit-vector (e.g., using a first bit-vector as a first input and the second bit-vector as a second input) can include performing, in parallel, the logical operation on each of the respective bits at corresponding bit positions of the bit-vectors. As an example, the result of a logical OR operation performed on a first bit-vector "a" (e.g., [$a_0$ $a_1$ $a_2$ $a_3$]) and a second bit-vector "b" (e.g., [$b_0$ $b_1$ $b_2$ $b_3$]) is a bit-vector "c" (e.g., [$c_0$ $c_1$ $c_2$ $c_3$]) whose MSB (e.g., $c_0$) is the result of performing an OR operation (e.g., "ORing") the MSB of bit-vector "a" and the MSB of bit-vector "b," whose next MSB is the result of ORing the next MSBs of bit-vectors "a" and "b," and whose LSB is the result of ORing the LSB of bit-vector "a" and the LSB of bit-vector "b" (e.g., $c_0=a_0$ OR $b_0$; $c_1=a_1$ OR $b_1$; $c_2=a_2$ OR $b_2$; $c_3=a_3$ OR $b_3$). For instance, performing an OR operation on a bit-vector [1110] and on bit-vector [1000] would result in bit-vector [1110] (e.g., the MSB of the resultant bit-vector is "1" since "1" OR "1" is "1", the next MSB is "1" since "1" OR "0" is "1", the next MSB is "1" since "1" OR "0" is "1", and the LSB is "0" since "0" OR "0" is "0").

Reference number 4 of the above pseudocode (e.g., "Create ELEMENT MASK bit-vector with all true bits as if all elements are smallest value elements") is associated with creating a mask bit-vector (e.g., ELEMENT MASK 437) that can be used in association with generating a mask indicating a smallest value element. As shown in row 451-4, the bit-vector 437 can initially be set to [0xFFFFFFFF] (e.g., binary [1111 1111 1111 1111 1111 1111 1111 1111]). An example of creating the bit-vector 437 can include setting COMP_COMP 431 to include all "1"s (e.g., [0xFFFFFFFF]) and copying the data pattern to the cells storing ELEMENT MASK 437. As described further below, the bit-vector 437 can be updated as a result of performance of a number of iterations of operations.

Reference number 5 of the above pseudocode (e.g., "Start iteration of operations for given element width") is associated with performing a number of iterations of operations. As an example, the iterations can be described via a loop structure. As used herein, a "loop" is defined as a control flow statement that includes performing a number of iterations based on a boolean condition. A loop can be expressed via a FOR loop, a WHILE loop, and/or a DO loop, among other possible loop structures. Each iteration of the loop that is associated with reference number 5 can include performing a number of operations. The number of operations can include performing logical operations (e.g., OR operations, and/or AND operations), among other operations.

The example described in association with FIG. 4 includes performing a FOR loop that includes performing a number of iterations of a number of operations. In this example, the number of iterations is equal to the element width (e.g., four). Therefore, in this example, the FOR loop includes performing the number of operations four times. Index "E" can be used to indicate a particular iteration of the FOR loop. Index "E" can be initialized to zero and can be incremented (e.g., by 1) at the beginning of each iteration of the FOR loop while E is less than the element width (e.g., E<4). The index can be incremented, for example, via a counter, which may reside on a controller such as controller 140 shown in FIG. 1. In a number of embodiments, the index E can be stored in the array (e.g., as a bit-vector), and can be incremented via an addition operation, as described further below in association with FIGS. 5A and 5B.

The index E can be initialized to "0" prior to performing a first iteration of the FOR loop. With E=0 (e.g., E less than 4), the operations corresponding to reference numbers 5.a through 5.e.iii in the pseudocode above are performed.

Reference number 5.a (e.g., "Load BOUNDARY bit-vector into COMP_COMP") is associated with loading the bit-vector 435 (e.g., [0x88888888]) from the array into the sensing components as COMP_COMP 431. Reference number 5.b (e.g., "Check if first bits for elements needs to skip") is associated with determining if E is greater than 0 (e.g., if the present iteration of the FOR loop is the first iteration). Since the current iteration of the FOR loop is a first iteration, the operations described by reference numbers 5.b.i and 5.b.ii are not performed (e.g., are skipped). Therefore, as shown in rows 451-5.1.b and 451-5.1.c of FIG. 4, the bit-vectors 431, 433, 435, 437, and 443 remain unchanged. The operations described by reference numbers 5.b.i to 5.b.ii will be described below in association with subsequent iterations of the FOR loop (e.g., iterations corresponding to E=1, E=2, and E=3).

Reference number 5.c (e.g., "AND COMP_COMP and INVERTED ELEMENTS bit-vector") is associated with performing on AND operation on COMP_COMP 431 and INVERTED ELEMENTS bit-vector 433. The result of performing and AND operation (e.g., "ANDing") COMP_COMP 431 (e.g., [0x88888888]) and bit-vector 433 (e.g., [0x54321ED]) is bit-vector [0x00000088], which is stored in the sensing components as COMP_COMP 431 subsequent to the AND operation (e.g., as shown in row 451-5.1.c. Reference number 5.d (e.g., "Store as RESULT bit-vector") is associated with storing the result of the AND operation as RESULT bit-vector 443. The result of the AND operation, which resides COMP_COMP 431 as result bit-vector 443, can be copied to the cells storing RESULT bit-vector 443. As such, as shown in row 451-5.1.*d*, bit-vector 443 is [0x00000088].

Reference number 5.*e* (e.g., "if BlockOR is true") is associated with performing a check to determine whether the smallest value element mask has been created. In a number of embodiments, performing the check can include performing a "BlockOR" operation. As used herein, a BlockOR operation refers to determining whether one or more (e.g., any) of the compute components (e.g., 331-0 to 331-X) and/or sense amplifiers (e.g., 306-0 to 306-U) coupled to a particular group of sense lines (e.g., 305-0 to 305-5) store a particular data value (e.g., a "1" or a "0"). For example, determining whether any of the compute components 331-0 to 331-31 coupled to sense lines 305-0 to 305-31 store a particular data value can include charging (e.g., precharging) a local I/O line, such as local I/O line 334 shown in FIG. 3, to a particular voltage, and then sensing (e.g., via a secondary sense amplifier, such as SSA 312 shown in FIG. 3) whether the voltage on the local I/O line changes (e.g., by more than a threshold amount) responsive to transferring (e.g., in parallel) the voltages corresponding to the data latched in the selected compute components 331-0 to 331-31 to the local I/O line. The I/O line (e.g., I/O line 334) can be precharged via control circuitry such as controller 140 shown in FIG. 1 and/or sensing circuitry such as circuitry 150 shown in FIG. 1, for instance, to a voltage such as a supply voltage (e.g., Vcc) or a ground voltage (e.g., 0V).

Transferring the voltages corresponding to the data latched in the selected compute components 331-0 to 331-31 can include activating (e.g., in parallel) the column decode lines (e.g., column decode lines 310-0 to 310-W in FIG. 3) corresponding to the selected sensing components (e.g., compute components 331-0 to 331-31 in this example) such that respective transistors 308-0 to 308-31 are enabled (e.g., turned on).

As an example, to determine whether one or more of the selected compute components 331-0 to 331-31 stores (e.g., latches) a data value of "1" (e.g., a logic 1 which can be represented by a supply voltage Vcc), the local I/O line (e.g., I/O line 334) can be precharged to a ground voltage (e.g., 0V, which can represent a latched data value of "0"). The corresponding column decode lines 310-0 to 310-31 can be activated, and if one or more of the selected compute components 331-0 to 331-31 stores a logic 1 (e.g., Vcc), then the SSA (e.g., SSA 312) can sense a pull up (e.g., increase) of the voltage on the I/O line (e.g., I/O line 334) which indicates that at least one of the selected compute components 331-0 to 331-31 stores a "1," which can be indicated by the BlockOR operation returning a value of "true" (e.g., "1"). In this example, if none of the compute components 331-0 to 331-31 stored a "1," then the voltage on the I/O line would not be pulled up, which can be indicated by the BlockOR operation returning a value of "false" (e.g., "0").

Alternatively, to determine whether one or more of the selected compute components 331-0 to 331-31 stores (e.g., latches) a data value of "0," the I/O line (e.g., I/O line 334) can be pre-charged to a supply voltage (e.g., Vcc). The corresponding column decode lines 310-0 to 310-31 can be activated, and if one or more of the selected compute components 331-0 to 331-31 stores a logic 0 (e.g., 0V), then the SSA (e.g., SSA 312) can sense a pull down (e.g., decrease) of the voltage on the I/O line (e.g., I/O line 334) which indicates that at least one of the selected compute components 331-0 to 331-31 stores a "0."

The determination of whether one or more compute components (e.g., 331-0 to 331-X) and/or sense amplifiers (e.g., 306-0 to 306-U) coupled to selected column decode lines (e.g., column decode lines 310-0 to 310-W) stores a particular data value (e.g., a data value of "1") is effectively performing a logic "OR" operation (e.g., since the operation returns a "1" if any of the data values are "1" and the operation returns a "0" only if all of the data values are "0"), which is why the operation may be referred to as a "BlockOR" operation. Embodiments of the present disclosure are not limited to particular pre-charge voltages of the local I/O line and/or to particular voltage values corresponding to logic "1" and logic "0".

In the example described in FIG. 4, performing a BlockOR on the COMP_COMP 431 (e.g., [0x00000088]) returns a true value because the data pattern corresponding to COMP_COMP 431 includes at least one bit being logic "1". Since the BlockOR returns "true," the operations described by reference numbers 5.*e.i* to 5.*e.iii* are performed. If the BlockOR returns "false," then the operations described by reference numbers 5.*e.i* to 5.*e.iii* are not performed (e.g., and the RESULT bit-vector 443 can be updated so as to indicate the smallest value element).

Reference number 5.*e.i* (e.g., "Create a least significant bit pattern and store as LSB bit-vector") is associated with generating a bit-vector that provides an indication of the boundaries of the respective elements within an elements bit-vector (e.g., ELEMENTS bit-vector 445) and storing it in the cells corresponding to LSB bit-vector 439. In this example, the bit pattern corresponding to LSB bit-vector 439 comprises a logic "1" at those bit positions corresponding to a least significant bit of the respective elements and a logic "0" at the remaining bit positions. Since, in this example, each of the eight elements comprise four bits, the LSB bit-vector 439 is [0x11111111] (e.g., binary [0001 0001 0001 0001 0001 0001 0001 0001]). An example of determining a LSB for each element of bit-vector 445 can include setting COMP_COMP 431 to include all "1"s (e.g., bit-vector [0xFFFFFFFF]) and shifting right (e.g., in an LSB direction) one bit position (e.g., resulting in bit-vector [0x7FFFFFFF]). The right-shifted bit-vector [0x7FFFFFFF] can be inverted (e.g., via an invert operation within the sensing circuitry) resulting in [0x80000000], and the inverted bit-vector [0x80000000] can be shifted right a number of times equal to the element width minus one (e.g., by three bit positions in this example since each element has a width of four bits) resulting in bit-vector [0x10000000]. The resulting bit-vector [0x10000000] can also be shifted right a number of times equal to the element width minus one (e.g., by three positions in this example) resulting in bit-vector [0x01000000]. The bit-vector [0x10000000] can be ORed with the bit-vector (e.g., [0x01000000]), resulting in bit-vector [0x11000000]. The OR operation can be repeated to result in a bit-vector that indicates a LSB for each element (e.g., bit-vector [0x1 1111111] with each "1" indicating the LSB position of the respective elements) such as COMP_COMP 431 shown at row 451-5.1.*e.i* in FIG. 4. The resulting bit-vector (e.g., [0x11111111]) can be copied to the cells storing LSB bit-vector 439.

Reference number 5.*e.ii* (e.g., "Compare RESULT bit-vector and LSB bit-vector and store as TMP bit-vector") is associated with performing a compare operation between the RESULT bit-vector 443 and the LSB bit-vector 439 and storing the result of the comparison in the cells corresponding to TMP bit-vector 441. The compare operation can include determining whether the values of the constituent elements of bit-vector 443 are greater than or equal to the corresponding constituent elements of bit-vector 439. An example of a compare operation is described below in FIGS.

5A and 5B. In this example, the bit pattern corresponding to TMP bit-vector 441 comprises a bit-vector [0x0] (e.g., binary [0000]) to indicate that a particular element of bit-vector 443 is less than the corresponding element of bit-vector 439, and a bit-vector [0xF] (e.g., binary [1111]) to indicate that a particular element of bit-vector 443 is greater than or equal to bit-vector 439. As shown in row 451-5.1.*e.ii*, RESULT bit-vector 443 is [0x00000088] and LSB bit-vector 439 is [0x11111111]. Therefore, since six of the elements of result bit-vector 443 (e.g., the leftmost six elements) have values that are smaller than the corresponding elements from LSB bit-vector 439 (e.g., [0x0]<[0x1]) and two of the elements of result bit-vector 443 (e.g., the rightmost two elements) have values that are greater than the corresponding elements from LSB bit-vector 439 (e.g., [0x8]>[0x1]), the resultant bit-vector of the compare operation is [0x000000FF]. As such, row 451-5.1.*e.ii* indicates that TMP bit-vector 441 is [0x000000FF].

As described further in FIGS. 5A and 5B, in a number of examples, a compare operation can include performing a number of operations. The number of operations that are associated with performing the compare operation can be performed using the sensing circuitry (e.g., a sense amplifiers 306 and/or the compute components 331 in FIG. 3). The number of operations that are associated with the compare operation can be performed in parallel and without transferring data via an input/output (I/O) line. The number of operations can include a number of AND operations, OR operations, SHIFT operations, and INVERT operations, for example.

Reference number 5.*e.iii* (e.g., "Update ELEMENT MASK bit-vector with TMP bit-vector") is associated with updating ELEMENT MASK bit-vector 437 with TMP bit-vector 441. Updating bit-vector 441 and bit-vector 437 can include copying the bit-vector 441 to the cells corresponding to bit-vector 437. In this example, TMP bit-vector 441 is [0x000000FF], which can be copied to bit-vector 437. Accordingly, as shown in row 451-5.1.*e.iii*, the ELEMENT MASK bit-vector 437 is [0x000000FF] after the first iteration of the FOR loop.

For a second iteration of the FOR loop corresponding to the above pseudocode, index E can be incremented (e.g., from 0 to 1). Since index E is less that the element width (e.g., 4 in this example), the operations associated with reference numbers 5.*a* to 5.*e.iii* are performed. Reference number 5.*a* (e.g., "Load BOUNDARY bit-vector into COMP_COMP") is associated with loading the boundary bit-vector 435 (e.g., [0X88888888]) into the sensing components corresponding to COMP_COMP 431. Reference number 5.*b* (e.g., "Check if first bits for elements needs to skip") is associated with determining if E is greater than 0. Since the current iteration (e.g., the second iteration) corresponds to index E=1, which is greater than 0, the operations described by reference numbers 5.*b.i* to 5.*b.ii* will be performed.

Reference number 5.*b.i* (e.g., "AND BOUNDARY bit-vector and ELEMENT MASK bit-vector") is associated with ANDing boundary bit-vector 435 (e.g., [0x88888888]) and element mask bit-vector 437 (e.g., [0x000000FF]) and storing the result as COMP_COMP 431. In this example, ANDing the bit-vector [0x88888888] and the bit-vector [0x000000FF] results in bit-vector [0x00000088] being stored as COMP_COMP 431. Reference number 5.*b.ii* (e.g., "Shift COMP_COMP right by current loop distance") is associated with right shifting COMP_COMP 431 a number of bit positions equal to E. In this example, the bits of COMP_COMP bit-vector 431 (e.g., [0x00000088]) are right shifted one bit position to the right (e.g., towards the LSB) resulting in bit-vector [0x00000044]. Therefore, as shown in row 451-5.2.*b*, the as COMP_COMP bit-vector is [0x00000044].

Reference number 5.*c* (e.g., "AND COMP_COMP and INVERTED ELEMENTS bit-vector") is associated with ANDing COMP_COMP 431 (e.g., [0x00000044]) and INVERTED ELEMENTS bit-vector 433 (e.g., [0x54321ED]), which results in bit-vector [0x00000044] being stored in the sensing components corresponding to COMP_COMP bit-vector 431. Reference number 5.*d* (e.g., "Store as RESULT bit-vector") is associated with copying the COMP_COMP bit-vector 431 to the cells corresponding to RESULT bit-vector 443. As such, row 451-5.2.*d* shows RESULT bit-vector 443 as [0x00000044].

Reference number 5.*e* (e.g., "if BlockOR is true") is associated with performing a BlockOR operation on COMP_COMP 431 (e.g., [0x00000044]), which returns a true value since COMP_COMP 431 comprises at least one logic "1" bit. Since the BlockOR is true, the operations described by reference numbers 5.*e.i* to 5.*e.iii* are performed.

Reference number 5.*e.i* (e.g., "Create a least significant bit pattern and store as LSB bit-vector") is associated with creating a bit-vector [0x11111111] and storing it as LSB bit-vector 439 (e.g., as described above in association with the first iteration). Reference number 5.*e.ii* (e.g., "Compare RESULT bit-vector and LSB bit-vector and store as TMP bit-vector") is associated with comparing a RESULT bit-vector 443 [0x00000044] with LSB bit-vector 439 [0x11111111] and storing the result of the comparison (e.g., [0x000000FF]) in TMP bit-vector 441. As such, row 451-5.2.*e.ii* indicates that TMP bit-vector 441 is [0x000000FF].

Reference number 5.*e.iii* (e.g., "Update ELEMENT MASK bit-vector with TMP bit-vector") is associated with updating ELEMENT MASK bit-vector 437 with TMP bit-vector 441. Updating bit-vector 441 and bit-vector 437 can include copying the bit-vector 441 to the cells corresponding to bit-vector 437. In this example, TMP bit-vector 441 is [0x000000FF], which can be copied to bit-vector 437. Accordingly, as shown in row 451-5.2.*e.iii*, the ELEMENT MASK bit-vector 437 is [0x000000FF] after the second iteration of the FOR loop.

For a third iteration of the FOR loop corresponding to the above pseudocode, index E can be incremented (e.g., from 1 to 2). Since index E is less that the element width (e.g., 4 in this example), the operations associated with reference numbers 5.*a* to 5.*e.iii* are performed. Reference number 5.*a* (e.g., "Load BOUNDARY bit-vector into COMP_COMP") is associated with loading the boundary bit-vector 435 (e.g., [0X88888888]) into the sensing components corresponding to COMP_COMP 431. Reference number 5.*b* (e.g., "Check if first bits for elements needs to skip") is associated with determining if E is greater than 0. Since the current iteration (e.g., the third iteration) corresponds to index E=2, which is greater than 0, the operations described by reference numbers 5.*b.i* to 5.*b.ii* will be performed.

Reference number 5.*b.i* (e.g., "AND BOUNDARY bit-vector and ELEMENT MASK bit-vector") is associated with ANDing boundary bit-vector 435 (e.g., [0x88888888]) and element mask bit-vector 437 (e.g., [0x000000FF]) and storing the result as COMP_COMP 431. In this example, ANDing the bit-vector [0x88888888] and the bit-vector [0x000000FF] results in bit-vector [0x00000088] being stored as COMP_COMP 431. Reference number 5.*b.ii* (e.g., "Shift COMP_COMP right by current loop distance") is associated with right shifting COMP_COMP 431 a number of bit positions equal to E. In this example, the bits of COMP_COMP bit-vector 431 (e.g., [0x00000088]) are right shifted two bit positions to the right (e.g., towards the LSB) resulting in bit-vector [0x00000022]. Therefore, as shown in row 451-5.3.*b*, the as COMP_COMP bit-vector is [0x00000022].

Reference number 5.*c* (e.g., "AND COMP_COMP and INVERTED ELEMENTS bit-vector") is associated with ANDing COMP_COMP 431 (e.g., [0x00000022]) and INVERTED ELEMENTS bit-vector 433 (e.g., [0x54321ED]), which results in bit-vector [0x00000020] being stored in the sensing components corresponding to COMP_COMP bit-vector 431. Reference number 5.*d* (e.g., "Store as RESULT bit-vector") is associated with copying the COMP_COMP bit-vector 431 to the cells corresponding to RESULT bit-vector 443. As such, row 451-5.3.*d* shows RESULT bit-vector 443 as [0x00000020].

Reference number 5.*e* (e.g., "if BlockOR is true") is associated with performing a BlockOR operation on COMP_COMP 431 (e.g., [0x00000020]), which returns a true value since COMP_COMP 431 comprises at least one logic "1" bit. Since the BlockOR is true, the operations described by reference numbers 5.*e.i* to 5.*e.iii* are performed.

Reference number 5.*e.i* (e.g., "Create a least significant bit pattern and store as LSB bit-vector") is associated with creating a bit-vector [0x11111111] and storing it as LSB bit-vector 439 (e.g., as described above in association with the first iteration). Reference number 5.*e.ii* (e.g., "Compare RESULT bit-vector and LSB bit-vector and store as TMP bit-vector") is associated with comparing a RESULT bit-vector 443 [0x00000020] with LSB bit-vector 439 [0x11111111] and storing the result of the comparison (e.g., [0x000000F0]) in TMP bit-vector 441. As such, row 451-5.3.*e.ii* indicates that TMP bit-vector 441 is [0x000000F0].

Reference number 5.*e.iii* (e.g., "Update ELEMENT MASK bit-vector with TMP bit-vector") is associated with updating ELEMENT MASK bit-vector 437 with TMP bit-vector 441. Updating bit-vector 441 and bit-vector 437 can include copying the bit-vector 441 to the cells corresponding to bit-vector 437. In this example, TMP bit-vector 441 is [0x000000F0], which can be copied to bit-vector 437. Accordingly, as shown in row 451-5.3.*e.iii*, the ELEMENT MASK bit-vector 437 is [0x000000F0] after the third iteration of the FOR loop.

For a fourth iteration of the FOR loop corresponding to the above pseudocode, index E can be incremented (e.g., from 2 to 3). Since index E is less that the element width (e.g., 4 in this example), the operations associated with reference numbers 5.*a* to 5.*e.iii* are performed. Reference number 5.*a* (e.g., "Load BOUNDARY bit-vector into COMP_COMP") is associated with loading the boundary bit-vector 435 (e.g., [0X88888888]) into the sensing components corresponding to COMP_COMP 431. Reference number 5.*b* (e.g., "Check if first bits for elements needs to skip") is associated with determining if E is greater than 0. Since the current iteration (e.g., the fourth iteration) corresponds to index E=3, which is greater than 0, the operations described by reference numbers 5.*b.i* to 5.*b.ii* will be performed.

Reference number 5.*b.i* (e.g., "AND BOUNDARY bit-vector and ELEMENT MASK bit-vector") is associated with ANDing boundary bit-vector 435 (e.g., [0x88888888]) and element mask bit-vector 437 (e.g., [0x000000F0]) and storing the result as COMP_COMP 431. In this example, ANDing the bit-vector [0x88888888] and the bit-vector [0x000000F0] results in bit-vector [0x00000080] being stored as COMP_COMP 431. Reference number 5.*b.ii* (e.g., "Shift COMP_COMP right by current loop distance") is associated with right shifting COMP_COMP 431 a number of bit positions equal to E. In this example, the bits of COMP_COMP bit-vector 431 (e.g., [0x00000088]) are shifted three bit positions to the right (e.g., towards the LSB) resulting in bit-vector [0x00000010]. Therefore, as shown in row 451-5.4.*b*, the as COMP_COMP bit-vector is [0x00000010].

Reference number 5.*c* (e.g., "AND COMP_COMP and INVERTED ELEMENTS bit-vector") is associated with ANDing COMP_COMP 431 (e.g., [0x00000010]) and INVERTED ELEMENTS bit-vector 433 (e.g., [0x54321ED]), which results in bit-vector [0x00000000] being stored in the sensing components corresponding to COMP_COMP bit-vector 431. Reference number 5.*d* (e.g., "Store as RESULT bit-vector") is associated with copying the COMP_COMP bit-vector 431 to the cells corresponding to RESULT bit-vector 443. As such, row 451-5.4.*d* shows RESULT bit-vector 443 as [0x00000000].

Reference number 5.*e* (e.g., "if BlockOR is true") is associated with performing a BlockOR operation on COMP_COMP 431 (e.g., [0x00000000]), which returns a "false" value since COMP_COMP 431 comprises no logic "1" bits. Since the BlockOR is false, the operations described by reference numbers 5.*e.i* to 5.*e.iii* are not performed.

Since index E is incremented during the fourth iteration (e.g., from E=3 to E=4), a fifth iteration of the FOR loop corresponding to the above pseudocode is not performed. For instance, determining that the index E is not less than the width of the elements (e.g., four) the control flow breaks from the FOR loop. As a result, the pseudocode corresponding to reference number 6 (e.g., "Copy ELEMENT MASK bit-vector to RESULT bit-vector and Return RESULT bit-vector") is performed. In a number of embodiments, subsequent to performing a final iteration of the FOR loop described above, the ELEMENT MASK bit-vector can represent a mask indicating the smallest value element. As such, the bit-vector 437 can be copied to RESULT bit-vector 443, and the bit-vector 445 can be provided (e.g., reported) to a suitable location (e.g., to a host and/or to a controller for possible further processing). In this example, after the fourth iteration of the FOR loop, the ELEMENT MASK bit-vector 437 is [0x000000F0], which is copied to the cells corresponding to bit-vector 443. As shown in row 451-6, RESULT bit-vector 443 is updated to [0x000000F0]. As described above, in this example, the RESULT bit-vector 443 comprises logic "1s" at the bit positions corresponding to the smallest value element(s) and logic "0s" at the remaining bit positions (e.g., those bit positions not corresponding the elements having a smallest value). As such, the expected result is confirmed since the smallest value element from among the 4-bit elements of ELEMENTS bit-vector 445 (e.g., [0xABCDEF12]) is the element [0x1] (e.g., the element having a decimal value "1," which is binary "0001").

FIG. 5A illustrates a table showing the states of memory cells of an array at a particular phase associated with determining a smallest value element in accordance with a number of embodiments of the present disclosure. The example described in association with FIG. 5A illustrates one example of a compare operation, which can be used to determine a smallest value element in accordance with embodiments described herein. The example of FIG. 5A includes comparing a first element stored in cells corresponding to a first bit-vector (e.g., A) with a second element stored in cells corresponding to a second bit-vector (e.g., B) with a result of the comparison being stored in cells corresponding to a third bit-vector (e.g., C). In this example, the elements comprise 4 bits representing respective decimal values. The example described in FIG. 5A includes comparing an example element A (e.g., [0010] having a decimal value of "2") with an example element B (e.g., [0001] having a decimal value of "1"). In this example, the result bit-vector C is configured to be [1111] when element A is greater than element B, and the result bit-vector C is configured to be [0000] when element A is less than element B. Figure The following pseudocode below can be used to describe the example compare operation.

| 0. | Load elements A, B, B', C |
|---|---|
| 1. | B' = INV(B) |
| 2. | C = A + B' |
| 3. | If BlockOR (C XOR 1111) true then |
| a. | C = 1111 |
| 4. | Return C |

The columns of FIG. 5A correspond to bit-vectors 531 (COMP_COMP), 561 (A), 563 (B), 565 (B'), and 567. For instance, the bit-vector 531 can represent data stored in a number of compute components (e.g., 331 shown in FIG. 3) during performance of a particular phase of a compare operation. Reference number 0 (e.g., "Load elements A, B, B', C") of the above pseudocode is associated with loading element A (e.g., [0010]) as bit-vector 561 and loading element B (e.g., [0001]) as bit-vector 563. In addition, temporary storage rows associated with bit-vectors 565 (B') and 567 (C) are initialized (e.g., the cells designated to store bit-vectors 565 and 567 are initially reset to [0000] as shown in row 553-0). Reference number 1 (e.g., "B'=INV(B)") of the above pseudocode is associated with inverting bit-vector 563 (e.g., inverting [0001]) and storing the result (e.g., [1110]) as bit-vector 565, as shown in row 553-1. As an example, an invert operation can be performed on bit-vector 563 by using sensing circuitry as described herein (e.g., by loading it into the compute components corresponding to bit-vector 531, inverting the constituent bits, and copying the result to the cells storing bit-vector 565). Reference number 2 (e.g., "C=A+B'") of the above pseudocode is associated with performing an ADD operation on bit-vector 461 (e.g., [0010]) and bit-vector 565 (e.g., [1110]). An example addition operation is described in FIG. 5B below. In this example, adding A and B' (e.g., [0010]+[1110]) results in C=[0000] (e.g., since only four bit positions are used to indicate the result and the binary representation of C is "10000"). As such, bit-vector 567 is [0000] as shown in row 553-2.

Reference number 3 (e.g., "If BlockOR (C XOR 1111) true then") of the above pseudocode is associated with performing an XOR on bit-vector 567 (C) and bit-vector [1111], and determining if one or more bits of the resultant bit-vector comprises a particular data value (e.g., whether any of the bits of the resultant bit-vector is a logic "1") by performing a BlockOR operation, such as described above in association with FIG. 4. The result of the XOR on bit-vector 567 (e.g., [0000]) and bit-vector [1111] is bit-vector [1111], and is stored in the compute components corresponding to COMP_COMP 531, as shown in row 553-3. Since the result of the XOR operation (e.g., [1111]) includes one or more "1" bits, the result of the BlockOR is "true" such that operations associated with reference number 3a are performed. Reference number 3a (e.g., "C=1111") of the above pseudocode is associated with storing bit-vector [1111] in the cells corresponding to bit-vector 567, as illustrated in row 553-4.

Reference number 4 (e.g., "Return C") of the above pseudocode is associated with returning the current bit-vector 567 as the result of the compare operation. In this example, the result of the compare operation is bit-vector [1111], which indicates the value of element A is greater than the value of element B. If the value of element B were greater than the value of element A, then the result of the compare operation would be bit-vector [0000]. The result of the compare operation can be copied from the sensing circuitry to the array and/or may be transferred to other suitable locations (e.g., to a controller such as controller 140 shown in FIG. 1 or elsewhere).

FIG. 5B illustrates a table showing the states of memory cells of an array at a particular phase associated with determining a smallest element in accordance with a number of embodiments of the present disclosure. The example described in association with FIG. 5B illustrates one example of an addition operation, which can be used to determine a smallest value element in accordance with embodiments described herein. The example of FIG. 5B includes adding a first element stored in cells corresponding to a first bit-vector (e.g., A) and a second element stored in cells corresponding to a second bit-vector (e.g., B), with a result of the addition operation being stored in cells corresponding to a third bit-vector (e.g., C). In this example, the elements comprise 4 bits representing respective decimal values. The example described in FIG. 5A includes adding an example element A (e.g., [0010] having a decimal value of "2") to an example element B (e.g., [0001] having a decimal value of "1"). In this example, the expected result is bit-vector C [0011] having a decimal value of "3." The following pseudocode below can be used to describe the example addition operation.

| 0. | | Load elements A, B, Get Temp C, CARRY |
|---|---|---|
| 1. | | For All Elements C[i] = A[i] XOR B[i] |
| | 1.a | Starting with LSB, CARRY = A[i] AND B[i] |
| | 1.b | If BlockOR (CARRY) true, then |
| | | 1.b.i  CARRY = Left Shift CARRY |
| | | 1.b.ii C[i] = C[i] XOR CARRY |
| 2. Return C | | |

The columns of FIG. 5B correspond to bit-vectors 562 (CARRY), 564 (A), 566 (B), and 568 (C). Reference number 0 (e.g., "Load elements A, B, Get Temp C, CARRY") of the above pseudocode is associated with loading element A (e.g., [0010]) and element B (e.g., [0001]) as respective bit-vectors 564 and 566. In addition, temporary storage rows associated with bit-vectors 562 (CARRY) and 568 (C) are initialized (e.g., the cells designated to store bit-vectors 562 and 568 are initially reset to [0000] as shown in row 555-0).

Reference number 1 (e.g., "For All Elements C[i]=A[i] XOR B[i]") of the above pseudocode is associated with a "FOR loop" that includes performing an XOR operation on bits of A and B at corresponding bit positions corresponding to a particular iteration, indicated by index "i". For instance, in a first iteration (e.g., i=1), an XOR on the LSB of A (e.g., A[1]) and the LSB of B (e.g., B[1]) is performed, in a second iteration (e.g., i=2), an XOR on the respective next to least significant bits of A (e.g., A[2] and B (e.g., B[2]) is performed, in a third iteration (e.g., i=3), an XOR on the respective next to most significant bits of A (e.g., A[3]) and B (e.g., B[3]) is performed, and in a fourth iteration (e.g., i=4), an XOR on the respective most significant bits of A (e.g., A[4]) and B (e.g., B[4]) is performed. In this example, the first iteration includes XORing LSBs of A and B (e.g., the bolded bits of [0000] and [0001]), which results in bit-vector [0001] being stored in cells corresponding to bit-vector 568 (e.g., C=[0001]), as shown in row 555-1.1.

Reference number 1.*a* (e.g., "Starting with LSB, CARRY=A[i] AND B[i]") of the above pseudocode is associated with starting with a least significant bit (LSB) position corresponding to a particular iteration (e.g., in a first iteration, a LSB, in a second iteration, a next to least significant bit, in a third iteration, a next to most significant bit, and in a fourth iteration, a most significant bit position). For example, in this first iteration, the LSB bit of bit-vector 564 (e.g., bolded bit [0010]) is ANDed with the LSB of bit-vector 566 (e.g., bolded bit [0001]), resulting in bit-vector [0000] being stored in the cells corresponding to bit-vector 562. A BlockOR (as described above) is performed in association with reference number 1.*b* to determine if any bits of bit-vector 562 are "true" (e.g., logic "1"). Since none of the bits of bit-vector 562 are logic "1" during the first iteration (e.g., the BlockOR returns "false"), the pseudocode corresponding to reference numbers 1.*b.i* and 1.*b.ii* are not performed. However, for example, had bit-vector 562 have been [0001] during the first iteration, the pseudocode corresponding to reference numbers 1.*b.i* and 1.*b.ii* would have been performed (e.g., the bit-vector [0001] would have been left shifted to result in [0010] and the shifted vector would have been XORed with bit-vector 568), resulting in bit-vector 568 (C) being [0011] (e.g., [0010] XOR [0001]=[0011]).

During a second iteration, reference number 1 (e.g., "For All Elements C[i]=A[i] XOR B[i]") of the above pseudocode is associated with performing an XOR operation on bits of A and B at corresponding bit positions corresponding to the next to least significant bits. For example, XORing the respective next to least significant bits of A and B (e.g., bolded bits of [0010] and [0001]) results in C[2]=[0011]. As such, row 555-1.2 illustrates bit-vector 568 being [0011].

Reference number 1.*a* (e.g., "Starting with LSB, CARRY=A[i] AND B[i]"), for a second iteration, is associated with ANDing the next to least significant bits of A and B (e.g., A[2] AND B[2]). For example, in this second iteration, the next to least significant bit of bit-vector 564 (e.g., bolded bit [0010]) is ANDed with the next to LSB of bit-vector 566 (e.g., bolded bit [0001]), resulting in [0000] being stored in the cells corresponding to bit-vector 562. A BlockOR (as described above) is performed to determine if any bits of bit-vector 562 are logic "1". Since no bits in bit-vector 562 are "1" during the second iteration, the operations corresponding to reference numbers 1.*b.i* and 1.*b.ii* are not performed in the second iteration (e.g., for i=2]).

During a third and fourth iteration, the CARRY bit-vector, bit-vector 562, remains [0000] (e.g., the CARRY bit-vector doesn't change) and bit-vector 568 remains [0011]. Since CARRY remains [0000], the BlockOR associated with reference number 1.*b* returns "false" such that there is no shifting of the bit-vector 562 associated with reference numbers 1.*bi* and 1.*bii*. At the completion of the addition operation, the cells corresponding to bit-vector 568 store the result. For instance, row 555-1.4a indicates the expected result (e.g., C=[0011]) of adding the values of A and B. Reference number 2 of the above pseudocode (e.g., "Return C") indicates that the result of the addition operation (e.g., bit-vector 568) can be provided to a suitable location, which can include copying the result bit-vector to the array and/or transferring the result to a controller (e.g., 140), for instance.

Although the example described in FIG. 5B includes adding a single 4-bit element to another single 4-bit element, embodiments are not so limited. For instance, a first bit-vector may comprise a plurality of constituent bit-vector elements and a second bit-vector may comprise a plurality of constituent bit-vectors, and the respective corresponding constituent bit-vector elements can be added, in parallel.

FIG. 6 illustrates a timing diagram associated with performing a logical AND operation and a shifting operation using the sensing circuitry in accordance with a number of embodiments of the present disclosure. FIG. 6 includes waveforms corresponding to signals EQ, ROW X, ROW Y, SENSE AMP, TF, TT, FT, FF, PHASE 1R, PHASE 2R, PHASE 1L, PHASE 2L, ISO, Pass, Pass*, DIGIT, and DIGIT_. The EQ signal corresponds to an equilibrate signal associated with a sense amplifier (e.g., EQ 226 shown in FIG. 2B). The ROW X and ROW Y signals correspond to signals applied to respective access lines (e.g., access lines 304 shown in FIG. 3) to access a selected cell (or row of cells). The SENSE AMP signal corresponds to a signal used to enable/disable a sense amplifier (e.g., sense amplifier 206). The TF, TT, FT, and FF signals correspond to logic selection control signals such as those shown in FIGS. 2A and 2C (e.g., signals coupled to logic selection transistors 262, 252, 254, and 264). The PHASE 1R, PHASE 2R, PHASE 1L, and PHASE 2L signals correspond to the control signals (e.g., clock signals) provided to respective control lines 282, 283, 291 and 292 shown in FIG. 2A. The ISO signal corresponds to the signal coupled to the gates of the isolation transistors 250-1 and 250-2 shown in FIG. 2A. The PASS signal corresponds to the signal coupled to the gates of pass transistors 207-1 and 207-2 shown in FIG. 2A, and the PASS* signal corresponds to the signal coupled to the gates of the swap transistors 242. The DIGIT and DIGIT_signals correspond to the signals present on the respective sense lines 205-1 (e.g., DIGIT (n)) and 205-2 (e.g., DIGIT (n)_).

The timing diagram shown in FIG. 6 is associated with performing a logical AND operation on a data value stored in a first memory cell and a data value stored in a second memory cell of an array. The memory cells can correspond to a particular column of an array (e.g., a column comprising a complementary pair of sense lines) and can be coupled to respective access lines (e.g., ROW X and ROW Y). In describing the logical AND operation shown in FIG. 6, reference will be made to the sensing circuitry described in FIG. 2A. For example, the logical operation described in FIG. 6 can include storing the data value of the ROW X memory cell (e.g., the "ROW X data value) in the latch of the corresponding compute component 231 (e.g., the "A" data value), which can be referred to as the accumulator 231, storing the data value of the ROW Y memory cell (e.g., the "ROW Y data value") in the latch of the corresponding sense amplifier 206 (e.g., the "B" data value), and performing a selected logical operation (e.g., a logical AND operation in this example) on the ROW X data value and the ROW Y data value, with the result of the selected logical operation being stored in the latch of the compute component 231.

As shown in FIG. 6, at time $T_1$, equilibration of the sense amplifier 206 is disabled (e.g., EQ goes low). At time $T_2$, ROW X goes high to access (e.g., select) the ROW X memory cell. At time $T_3$, the sense amplifier 206 is enabled (e.g., SENSE AMP goes high), which drives the complementary sense lines 205-1 and 205-2 to the appropriate rail voltages (e.g., $V_{DD}$ and GND) responsive to the ROW X data value (e.g., as shown by the DIGIT and DIGIT_ signals), and the ROW X data value is latched in the sense amplifier 206. At time $T_4$, the PHASE 2R and PHASE 2L signals go low, which disables feedback on the latch of the compute component 231 (e.g., by turning off transistors 286 and 290, respectively) such that the value stored in the compute component may be overwritten during the logical operation. Also, at time $T_4$, ISO goes low, which disables isolation transistors 250-1 and 250-2. At time $T_5$, TT and FT are enabled (e.g., go high), which results in PASS going high (e.g., since either transistor 252 or 254 will conduct depending on which of node ST2 or node SF2 was high when ISO was disabled at time $T_4$ (recall that when ISO is disabled, the voltages of the nodes ST2 and SF2 reside dynamically on the gates of the respective enable transistors 252 and 254). PASS going high enables the pass transistors 207-1 and 207-2 such that the DIGIT and DIGIT_ signals, which correspond to the ROW X data value, are provided to the respective compute component nodes ST2 and SF2. At time $T_6$, TT and FT are disabled, which results in PASS going low, which disables the pass transistors 207-1 and 207-2. It is noted that PASS* remains low between time $T_5$ and $T_6$ since the TF and FF signals remain low. At time $T_7$, ROW X is disabled, and PHASE 2R, PHASE 2L, and ISO are enabled. Enabling PHASE 2R and PHASE 2L at time $T_7$ enables feedback on the latch of the compute component 231 such that the ROW X data value is latched therein. Enabling ISO at time $T_7$ again couples nodes ST2 and SF2 to the gates of the enable transistors 252, 254, 262, and 264. At time $T_8$, equilibration is enabled (e.g., EQ goes high such that DIGIT and DIGIT_ are driven to an equilibrate voltage such as $V_{DD}/2$) and the sense amplifier 206 is disabled (e.g., SENSE AMP goes low).

With the ROW X data value latched in the compute component 231, equilibration is disabled (e.g., EQ goes low at time $T_9$). At time $T_{10}$, ROW Y goes high to access (e.g., select) the ROW Y memory cell. At time $T_{11}$, the sense amplifier 206 is enabled (e.g., SENSE AMP goes high), which drives the complementary sense lines 205-1 and 205-2 to the appropriate rail voltages (e.g., $V_{DD}$ and GND) responsive to the ROW Y data value (e.g., as shown by the DIGIT and DIGIT_ signals), and the ROW Y data value is latched in the sense amplifier 206. At time $T_{12}$, the PHASE 2R and PHASE 2L signals go low, which disables feedback on the latch of the compute component 231 (e.g., by turning off transistors 286 and 290, respectively) such that the value stored in the compute component may be overwritten during the logical operation. Also, at time $T_{12}$, ISO goes low, which disables isolation transistors 250-1 and 250-2. Since the desired logical operation in this example is an AND operation, at time $T_{13}$, TT is enabled while TF, FT and FF remain disabled (as shown in TABLE 13-2, FF=0, FT=0, TF=0, and TT=1 corresponds to a logical AND operation). Whether enabling TT results in PASS going high depends on the value stored in the compute component 231 when ISO is disabled at time $T_{12}$. For example, enable transistor 252 will conduct if node ST2 was high when ISO is disabled, and enable transistor will not conduct if node ST2 was low when ISO was disabled at time $T_{12}$.

In this example, if PASS goes high at time $T_{13}$, the pass transistors 207-1 and 207-2 are enabled such that the DIGIT and DIGIT_ signals, which correspond to the ROW Y data value, are provided to the respective compute component nodes ST2 and SF2. As such, the value stored in the compute component 231 (e.g., the ROW X data value) may be flipped, depending on the value of DIGIT and DIGIT_(e.g., the ROW Y data value). In this example, if PASS stays low at time $T_{13}$, the pass transistors 207-1 and 207-2 are not enabled such that the DIGIT and DIGIT_ signals, which correspond to the ROW Y data value, remain isolated from the nodes ST2 and SF2 of the compute component 231. As such, the data value in the compute component (e.g., the ROW X data value) would remain the same.

At time $T_{14}$, TT is disabled, which results in PASS going (or remaining) low, such that the pass transistors 207-1 and 207-2 are disabled. It is noted that PASS* remains low between time $T_{13}$ and $T_{14}$ since the TF and FF signals remain low. At time $T_{15}$, ROW Y is disabled, and PHASE 2R, PHASE 2L, and ISO are enabled. Enabling PHASE 2R and PHASE 2L at time $T_{15}$ enables feedback on the latch of the compute component 231 such that the result of the AND operation (e.g., "A" AND "B") is latched therein. Enabling ISO at time $T_{15}$ again couples nodes ST2 and SF2 to the gates of the enable transistors 252, 254, 262, and 264. At time $T_{16}$, equilibration is enabled (e.g., EQ goes high such that DIGIT and DIGIT_ are driven to an equilibrate voltage) and the sense amplifier 206 is disabled (e.g., SENSE AMP goes low).

The result of the AND operation, which is initially stored in the compute component 231 in this example, can be transferred back to the memory array (e.g., to a memory cell coupled to ROW X, ROW Y, and/or a different row via the complementary sense lines) and/or to an external location (e.g., an external processing component) via I/O lines.

FIG. 6 also includes (e.g., at 601) signaling associated with shifting data (e.g., from a compute component 231 to an adjacent compute component 231). The example shown in FIG. 6 illustrates two left shifts such that a data value stored in a compute component corresponding to column "N" is shifted left to a compute component corresponding to column "N-2". As shown at time $T_{16}$, PHASE 2R and PHASE 2L are disabled, which disables feedback on the compute component latches, as described above. To perform a first left shift, PHASE 1L is enabled at time $T_{17}$ and disabled at time $T_{18}$. Enabling PHASE 1L causes transistor 289 to conduct, which causes the data value at node SF1 to move left to node SF2 of a left-adjacent compute component 231. PHASE 2L is subsequently enabled at time $T_{19}$ and disabled at time $T_{20}$. Enabling PHASE 2L causes transistor 290 to conduct, which causes the data value from node ST1 to move left to node ST2 completing a left shift.

The above sequence (e.g., enabling/disabling PHASE 1L and subsequently enabling/disabling PHASE 2L) can be repeated to achieve a desired number of left shifts. For instance, in this example, a second left shift is performed by enabling PHASE 1L at time $T_{21}$ and disabling PHASE 1L at time $T_{22}$. PHASE 2L is subsequently enabled at time $T_{23}$ to complete the second left shift. Subsequent to the second left shift, PHASE 2L remains enabled and PHASE 2R is enabled (e.g., at time $T_{24}$) such that feedback is enabled to latch the data values in the compute component latches.

According to various embodiments, general computing can be enabled in a memory array core of a processor-in-memory (PIM) device such as a DRAM one transistor per memory cell (e.g., 1T1C) configuration at $6F^2$ or $4F^2$ memory cell sizes, for example. The advantage of the apparatuses and methods described herein may not be realized in terms of single instruction speed, but rather the cumulative speed that can be achieved by an entire bank of data being computed in parallel (e.g., in a SIMD manner) without ever transferring data out of the memory array (e.g., DRAM) or firing a column decode. In other words, data transfer time can be eliminated. For example, apparatus of the present disclosure can perform ANDs, ORs, or SHIFTs in parallel (e.g., concurrently), using data values in memory cells coupled to a data line (e.g., a column of 16K memory cells).

In order to perform various operations (e.g., ANDs, ORs, or SHIFTs) in parallel, it can be beneficial for data to be horizontally contiguous within memory (e.g., stored in consecutive physically adjacent memory cells), which can provide benefits such as facilitating efficient shifting of data and/or reducing and/or preventing the need to determine physical addresses of individual cells in association with performing the operations, among other benefits. Further, previous approaches may have included sensing circuits from which data is transferred (e.g., via a bus to an external processing resource) for logical operation processing (e.g., by using 32 or 64 bit registers), which can limit the amount of parallelism associated with performing logical operations as compared to a number of embodiments of the present disclosure. In this manner, significantly higher throughput is effectively provided along with more efficient use of avoiding transferring data out of the array by insuring the data is stored in such a way to perform operations on the data in parallel.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    storing an elements vector, received from a host, comprising a plurality of elements in a group of memory cells coupled to an access line of an array;
    performing, using sensing circuitry coupled to the array, an AND operation using a first vector and a second vector as inputs, with a result of the AND operation being stored in the array as a result vector, wherein one of the first vector and the second vector is a boundary bit-vector defining boundaries of the plurality of elements and an other vector is an inverted elements vector where the elements vector is inverted to generate the inverted elements vector;
    updating the result vector responsive to performing a plurality of subsequent logical operations using the sensing circuitry; and
    providing, to the host, a mask indicating which of the plurality of elements have one of the smallest value and the largest value.

2. The method of claim 1, further comprising performing logical operations at the host utilizing the mask.

3. The method of claim 1, further comprising providing the mask to the host by enabling a plurality of input/output (I/O) lines of a memory device on which the array resides.

4. The method of claim 1, wherein the second vector is an inverted elements vector, and wherein the method further comprises:
    determining the inverted elements vector by:
        loading the elements vector from the array to a plurality of sensing components of the sensing circuitry, wherein each of the plurality of sensing components comprises a sense amplifier and a compute component; and
        inverting the elements vector in the plurality of sensing components;
    moving the inverted elements vector from the plurality of sensing components to the array.

5. The method of claim 1, wherein providing the mask indication of which of the plurality of elements have the one of the smallest value and the largest value comprises generating a mask bit-vector that identifies which of the plurality of elements have the one of the smallest value and the largest value.

6. The method of claim 1, further comprising:
    performing the plurality of subsequent logical operations using the sensing circuitry by:
        performing a first subsequent logical operation using the first vector and a third vector as inputs;
        shifting a result of the first subsequent logical operation within the sensing circuitry;
        performing a second subsequent logical operation using the shifted result and the second vector as inputs; and
    updating the result vector by replacing it with a result of the second subsequent logical operation.

7. An apparatus, comprising:
    an array of memory cells configured to store a plurality of elements in a group of memory cells coupled to an access line;
    sensing circuitry coupled to the array; and
    a controller configured to generate a mask indicating which of the plurality of elements have one of a smallest value and a largest value by:
        causing an AND operation to be performed using the sensing circuitry, wherein the AND operation is performed using a first vector as a first input and a second vector as a second input and wherein one of the first vector and the second vector is a boundary bit-vector defining boundaries of the plurality of elements and an other vector is an inverted elements vector where the elements vector is inverted to generate the inverted elements vector;
        causing a result of the AND operation to be stored in the array as a results vector;
        causing the results vector to be updated responsive to performance of a plurality of subsequent logical operations using the sensing circuitry; and
        causing the mask indicating which of the plurality of elements have the one of the smallest value and the largest value to be stored in at least one of the sensing circuitry and the array.

8. The apparatus of claim 7, further comprising a host coupled to the memory device and configured to perform a plurality of operations on the mask received from a memory device.

9. The apparatus of claim 8, wherein the host is further configured to perform the plurality of operations utilizing a processor of the host.

10. The apparatus of claim 9, wherein the host is further configured to perform the plurality of operations utilizing an ALU of the processor of the host.

11. The apparatus of claim 7, wherein the sensing circuitry comprises a secondary sense amplifier coupled to the plurality of sensing components and configured to determine, in parallel, whether one or more of the plurality of sensing components is storing a particular data value.

12. The apparatus of claim 11, wherein each of the plurality of elements comprises at least four bits, wherein the first vector is the boundary bit-vector providing an indication of a most significant bit for the respective plurality of elements, and wherein the second vector is a bit-vector whose constituent bits are inverted with respect to the bits of the plurality of elements.

13. The apparatus of claim 7, wherein the controller is further configured to generate the mask indicating which of the plurality of elements have the one of the smallest value and the largest value by causing a comparison of the updated results vector with a vector providing an indication of a least significant bit for the respective plurality of elements.

14. The apparatus of claim 7, wherein the mask indicating which of the plurality of elements have the one of the smallest value and the largest value comprises a mask bit-vector having:
  a first bit value at those bit positions corresponding to bit positions of elements having the one of the smallest value and the largest value; and
  a second bit value at those bit positions corresponding to bit positions of elements not having the one of the smallest value and the largest value.

15. The apparatus of claim 7, wherein the controller is further configured to generate the mask indicating which of the plurality of elements have the one of the smallest value and the largest value by:
  causing the AND operation to be performed using the sensing circuitry without transferring data via an input/output line coupled to the sensing circuitry; and
  cause at least one of the plurality of subsequent logical operations to be performed using the sensing circuitry without transferring data via the input/output line.

16. A method comprising:
  transferring an elements vector stored in a group of memory cells of an array to sensing circuitry coupled to the array, the elements vector comprising a plurality of elements each having a respective value;
  performing an AND operation using the sensing circuitry, wherein the AND operation is performed using a first vector as a first input and a second vector as a second input and wherein one of the first vector and the second vector is a boundary vector defining boundaries of the plurality of elements and an other vector is an inverted elements vector where the elements vector is inverted to generate the inverted elements vector; and
  generating a mask vector indicating which of the plurality of elements have one of the smallest value and the largest value by controlling the sensing circuitry to perform a plurality of iterations of operations using a plurality of vectors including the boundary vector defining boundaries of the plurality of elements of the elements vector.

17. The method of claim 16, wherein performing each of the plurality of iterations of operations comprises loading the boundary vector from the array into the sensing circuitry, the boundary vector providing an indication of at least one of:
  a most significant data unit position of each of the plurality of elements; and
  a least significant data unit position of each of the plurality of elements.

18. The method of claim 17, wherein:
  the sensing circuitry comprises a plurality of sense amplifiers and a plurality of compute components; and
  for each of the plurality of iterations of operations:
    loading the boundary vector from the array into the sensing circuitry comprises loading the boundary vector into the plurality of compute components; and
    performing the respective iteration comprises performing a logical operation using the boundary vector as an input, a result of the logical operation residing in the plurality of compute components.

19. The method of claim 18, wherein performing the respective iteration further comprises:
  providing a shifted result by shifting the result of the logical operation by a particular number of data unit positions; and
  performing a second logical operation using the shifted result as a first input and an inverted elements vector as a second input, each data unit of the inverted elements vector being inverted as compared to corresponding data units of the elements vector.

20. The method of claim 19, wherein performing the respective iteration further comprises determining, in parallel, whether a results vector resulting from the second logical operation comprises one or more data units having a particular value.

* * * * *